(12) United States Patent
Brandt et al.

(10) Patent No.: US 12,160,401 B2
(45) Date of Patent: Dec. 3, 2024

(54) SHARING CONTENT IN A MESSAGING APPLICATION

(71) Applicant: Apple Inc., Cupertino, CA (US)

(72) Inventors: Michael Brandt, Los Altos, CA (US); Pierre J. De Filippis, San Jose, CA (US); Chelsea J. Leblanc, Mountain View, CA (US); Ge Yan, Campbell, CA (US); Gavin B. Thomson, Mountain View, CA (US); Van Hong, Sunnyvale, CA (US); Ahmed M. Bashir, Saratoga, CA (US); Randall S. Becker, Cupertino, CA (US); Stephen M. Lottermoser, San Jose, CA (US); Kevin Y. He, San Francisco, CA (US); Roberto Garcia, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 94 days.

(21) Appl. No.: 17/480,124

(22) Filed: Sep. 20, 2021

(65) Prior Publication Data

US 2022/0006767 A1 Jan. 6, 2022

Related U.S. Application Data

(62) Division of application No. 16/147,502, filed on Sep. 28, 2018, now Pat. No. 11,146,514.

(Continued)

(51) Int. Cl.
*G06F 15/16* (2006.01)
*G06F 16/176* (2019.01)
(Continued)

(52) U.S. Cl.
CPC ............ *H04L 51/08* (2013.01); *G06F 16/176* (2019.01); *G06F 16/955* (2019.01); *H04L 51/10* (2013.01)

(58) Field of Classification Search
CPC ....... H04L 51/08; H04L 51/10; G06F 16/955; G06F 16/176
(Continued)

(56) References Cited

U.S. PATENT DOCUMENTS

| 8,146,118 B2 | 3/2012 | Seo |
| 10,244,286 B1 * | 3/2019 | Jia ..................... H04N 21/44224 |

(Continued)

FOREIGN PATENT DOCUMENTS

| CN | 101884036 A | 11/2010 |
| CN | 103440193 A | 12/2013 |

(Continued)

OTHER PUBLICATIONS

European Office Action from European Patent Application No. 19714903.2, dated Jan. 28, 2022, 7 pages.
(Continued)

*Primary Examiner* — Kaylee J Huang
(74) *Attorney, Agent, or Firm* — BAKERHOSTETLER

(57) ABSTRACT

A device implementing a system for sharing groups of files within a messaging application includes a processor configured to provide, within the messaging application, a user interface element for sending at least one file to a participant in an active message thread of the messaging application, the at least one file having been determined to be relevant to the participant. The processor is further configured to, responsive to receiving a selection of the user interface element: transmit, to a server, a request to store the at least one file in association with a shared storage area, and to transmit, via the messaging application, a message to the participant in the active message thread, the message comprising information for accessing the at least one file associated with the shared storage area.

21 Claims, 17 Drawing Sheets

Related U.S. Application Data

(60) Provisional application No. 62/668,133, filed on May 7, 2018.

(51) Int. Cl.
*G06F 16/955* (2019.01)
*H04L 51/08* (2022.01)
*H04L 51/10* (2022.01)

(58) Field of Classification Search
USPC .............................. 709/206, 203, 213, 215
See application file for complete search history.

(56) References Cited

U.S. PATENT DOCUMENTS

| | | |
|---|---|---|
| 2003/0051207 A1 | 3/2003 | Kobayashi |
| 2003/0078968 A1 | 4/2003 | Needham |
| 2007/0112852 A1 | 5/2007 | Sorvari |
| 2007/0136419 A1 | 6/2007 | Taylor et al. |
| 2012/0151380 A1 | 6/2012 | Bishop |
| 2012/0331108 A1 | 12/2012 | Ferdowsi et al. |
| 2013/0104053 A1* | 4/2013 | Thornton ............... H04L 51/08 715/752 |
| 2014/0108506 A1* | 4/2014 | Borzycki ............ H04L 67/1095 709/204 |
| 2014/0181205 A1* | 6/2014 | Sherrets ................ G06Q 50/01 709/204 |
| 2015/0154751 A1 | 6/2015 | Satish |
| 2015/0200884 A1 | 7/2015 | Fioravanti |
| 2015/0227782 A1 | 8/2015 | Salvador |
| 2015/0264111 A1 | 9/2015 | Aleksandrov |
| 2015/0281918 A1 | 10/2015 | Anantharaju |
| 2015/0287416 A1* | 10/2015 | Brands ................. H04L 9/3231 704/273 |
| 2015/0350133 A1* | 12/2015 | Murphy ................ H04L 67/02 709/203 |
| 2016/0021042 A1 | 1/2016 | Alfieri |
| 2016/0021207 A1 | 1/2016 | Dingwall |
| 2016/0103932 A1 | 4/2016 | Sathish et al. |
| 2016/0226804 A1 | 8/2016 | Hampson |
| 2017/0041254 A1 | 2/2017 | Agara |
| 2017/0093780 A1 | 3/2017 | Lieb et al. |
| 2017/0110154 A1* | 4/2017 | Dai ...................... H04N 5/7605 |
| 2017/0187658 A1* | 6/2017 | Ryu ..................... G06F 16/583 |
| 2017/0188213 A1 | 6/2017 | Nirantar et al. |
| 2017/0230320 A1 | 8/2017 | Knight et al. |
| 2017/0257406 A1 | 9/2017 | Wilde et al. |
| 2017/0289235 A1 | 10/2017 | Mattox, Jr. et al. |
| 2018/0167451 A1 | 6/2018 | Yi |
| 2018/0219814 A1 | 8/2018 | Maarek |
| 2019/0020554 A1* | 1/2019 | Lilienthal ............... H04L 41/22 |
| 2019/0124021 A1 | 4/2019 | DeMattei |
| 2019/0206101 A1 | 7/2019 | De la Torre |

FOREIGN PATENT DOCUMENTS

| | | |
|---|---|---|
| CN | 103890797 A | 6/2014 |
| CN | 105893423 A | 8/2016 |
| CN | 107710270 A | 2/2018 |
| EP | 3076608 | 10/2016 |
| WO | WO 2015/122691 | 8/2015 |

OTHER PUBLICATIONS

Chinese Office Action from Chinese Patent Application No. 201980030889.9, dated Jan. 6, 2022, 15 pages including machine-generated English language translation.

European Office Action from European Patent Application No. 19714903.2, dated Jul. 21, 2021, 7 pages.

International Search Report and Written Opinion from PCT/US2019/021670, dated May 23, 2019, 12 pages.

Chinese Notice of Allowance from Chinese Patent Application No. 201980030889.9, dated Aug. 3, 2022, 6 pages including machine-generated translation.

Femminella, et al., "Gossip-based Signaling Dissemination Extension for Next Steps in Signaling," Proceedings of the 2012 IEEE Network Operations and Management Symposium, Apr. 2012, pp. 1022-1028.

Zhang, "Campus Information Website Front-end Design Based on XHTML+CSS," Journal of Wuhan Engineering Institute, Dec. 2017, vol. 29, No. 4, including English language abstract.

Extended European Search Report from European Patent Application No. 22205913.1, dated Feb. 28, 2023, 10 pages.

Chinese Office Action from Chinese Patent Application No. 202211272522.8, dated Jan. 17, 2024, 10 pages including English language translation.

Chinese Office Action from Chinese Patent Application No. 202211272522.8, dated Jul. 13, 2024, 13 pages including English language translation.

* cited by examiner

SHARING CONTENT IN A MESSAGING APPLICATION

CROSS-REFERENCE TO RELATED APPLICATIONS

The present application is a divisional of U.S. patent application Ser. No. 16/147,502, entitled "SHARING CONTENT IN A MESSAGING APPLICATION," filed Sep. 28, 2018, which claims the benefit of U.S. Provisional Patent Application Ser. No. 62/668,133, entitled "SHARING CONTENT IN A MESSAGING APPLICATION," filed May 7, 2018, each of which is hereby incorporated herein by reference in its entirety and made part of the present U.S. Utility patent application for all purposes.

TECHNICAL FIELD

The present description relates generally to electronic messaging, including sharing a collection of content, such as a collection of images, videos, documents, and the like, within a messaging application.

BACKGROUND

Messaging applications can provide the ability for person-to-person communication for users of electronic devices. Texts messages and other content such as images and videos, for example, can be transmitted using messaging applications. Electronic devices such as mobile phones, laptops, computers and smartwatches may be used to participate in electronic messaging. For example, a user of a first device may send content to another user of a second device using a messaging application.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A user of a messaging application may wish to send a group (or collection) of files (e.g., images such as photos, videos and/or documents) to one or more recipients. For example, the one or more recipients may be relevant to the group of image and/or video files, because they all attended a particular event together and/or generally shared an experience together. The subject system facilitates, within a messaging application, the sharing of a group of files with others.

The subject system provides a user interface within a messaging application running on an electronic device, for sending a group of files to one or more recipients. In one or more implementations, the one or more recipients are determined, e.g. automatically and/or by user selection, to be relevant to the group of files. The electronic device receives user input requesting that selected files (e.g., images, videos and/or documents) be sent to the recipient(s). The electronic device transmits the request to a server, which creates a shared storage area for the group of files. In one or more implementations, if the selected files are not already stored on the server, the electronic device also provides the selected files to the server.

The server provides, to the electronic device, metadata and other information for accessing the group of files from the shared storage area. The electronic device incorporates the received information for accessing the group of files into a message, such as a text message, and transmits the generated message to respective devices of the one or more recipients. Although the message may include a thumbnail and/or other representation of the group of files, the message does not include the group of files themselves. The one or more recipient devices receive the message, and display the message within a messaging application. The messaging application on the respective recipient devices provides each recipient with the option to accept access to the group of files and display the group of files. Upon accepting access to the group of files, the respective recipient devices may access the files via the shared storage area on the server.

Figure 1:
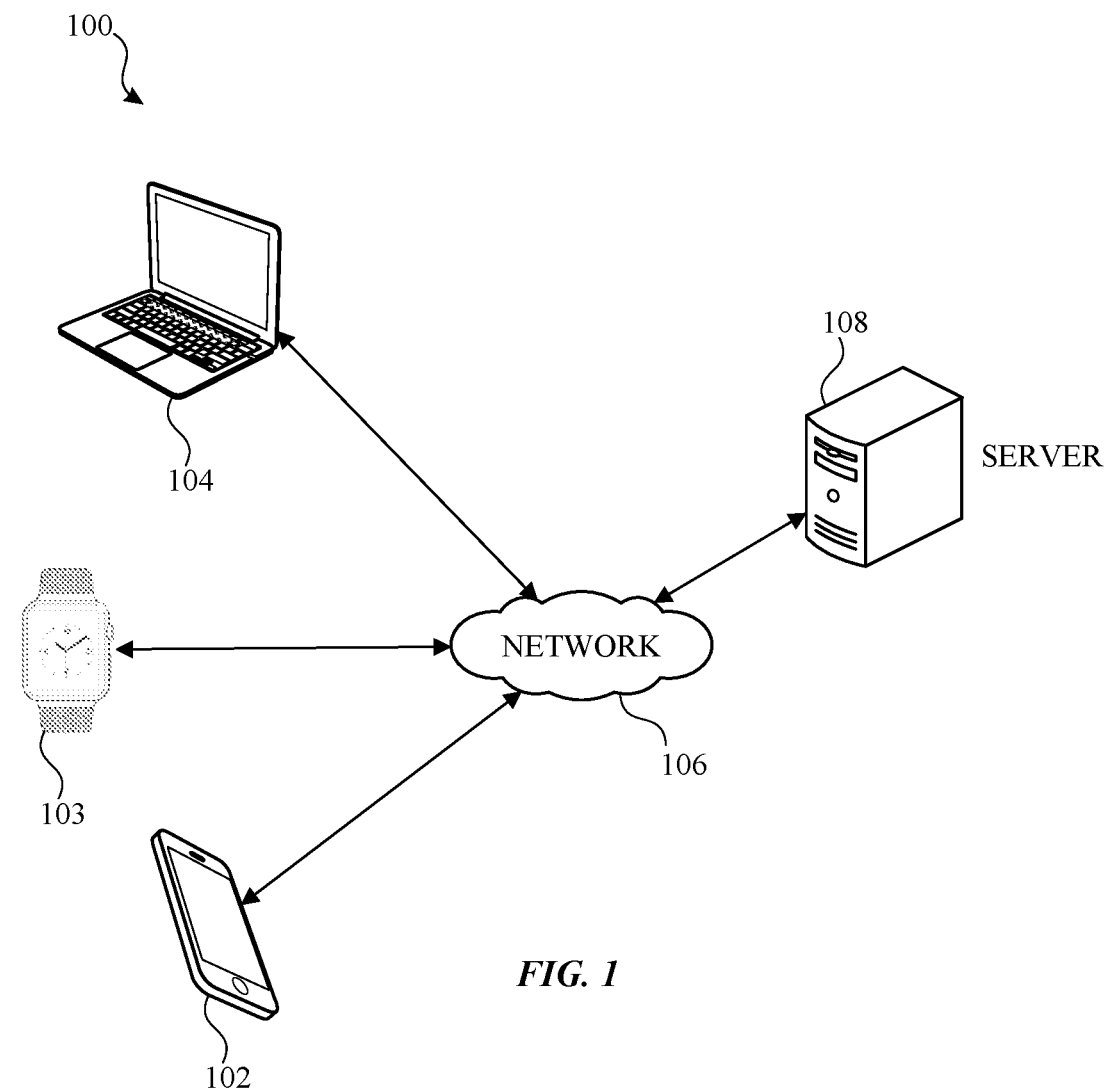
FIG. 1 illustrates an example network environment for sharing content in a messaging application in accordance with one or more implementations.

FIG. 1 illustrates an example network environment for sharing content in a messaging application in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes electronic devices 102, 103 and 104 (hereinafter 102-104), a network 106 and a server 108. The network 106 may communicatively (directly or indirectly) couple, for example, any two or more of the electronic devices 102-104 and/or the server 108. In one or more implementations, the network 106 may be an interconnected network of devices that may include, or may be communicatively coupled to, the Internet. For explanatory purposes, the network environment 100 is illustrated in FIG. 1 as including electronic devices 102-104 and a single server 108; however, the network environment 100 may include any number of electronic devices and any number of servers.

One or more of the electronic devices 102-104 may be, for example, a portable computing device such as a laptop computer, a smartphone, a peripheral device (e.g., a digital camera, headphones), a tablet device, a wearable device such as a smartwatch, a band, and the like, or any other appropriate device that includes, for example, one or more wireless interfaces, such as WLAN radios, cellular radios, Bluetooth radios, Zigbee radios, near field communication (NFC) radios, and/or other wireless radios. In FIG. 1, by way of example, the electronic device 102 is depicted as a smartphone, the electronic device 103 is depicted as a smartwatch, and the electronic device 104 is depicted as a laptop computer. Each of the electronic devices 102-104 may be, and/or may include all or part of the device discussed below with respect to FIG. 2, and/or the electronic system discussed below with respect to FIG. 16.

The server 108 may be, and/or may include all or part of the device discussed below with respect to FIG. 2, and/or the electronic system discussed below with respect to FIG. 16. The server 108 may include one or more servers, such as a cloud of servers, that may be used to facilitate the sharing content between the electronic devices 102-104. For example, the server 108 may receive a request from the electronic device 102 to create a shared storage area, for providing the electronic devices 103-104 with access to a group of files. The server may create a shared storage area associated with the group of files, and send information to access the shared storage area back to the electronic device 102. The electronic device 102 may generate a message with the received information and send the message to the electronic devices 103-104. For explanatory purposes, a single server 108 is shown and discussed with respect to various operations, such as messaging, providing a cloud-based service for maintaining user content, and/or creating shared storage areas that reference the user content. However, these and other operations discussed herein may be performed by one or more servers, e.g., at one or more different data centers, and each different operation may be performed by the same or different servers.

Figure 2:
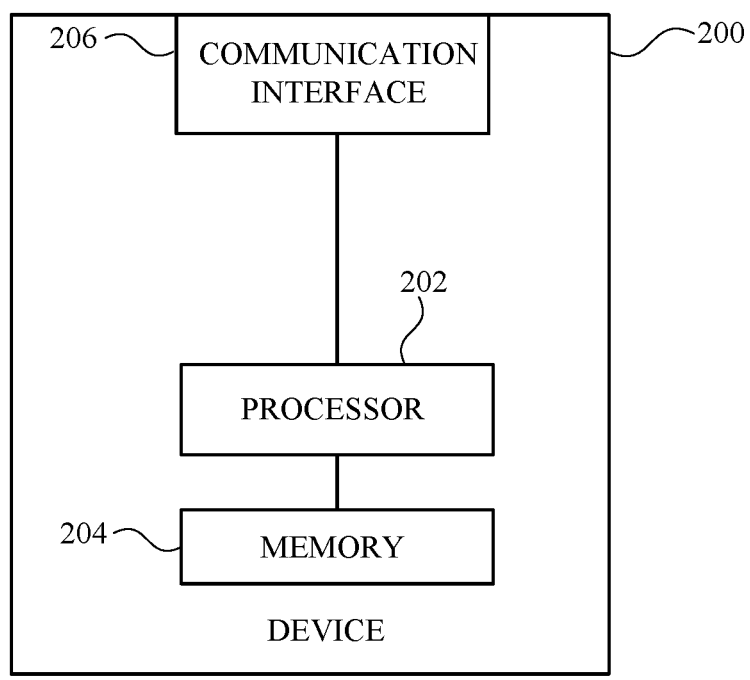
FIG. 2 illustrates an example device that may implement a system for sharing content in a messaging application in accordance with one or more implementations.

FIG. 2 illustrates an example device 200 that may implement a system for sharing content in a messaging application in accordance with one or more implementations. For example, the device 200 of FIG. 2 can correspond to any of the electronic devices 102-104, or to the server 108 of FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The device 200 may include a processor 202, a memory 204, and a communication interface 206. The processor 202 may include suitable logic, circuitry, and/or code that enable processing data and/or controlling operations of the device 200. In this regard, the processor 202 may be enabled to provide control signals to various other components of the device 200. The processor 202 may also control transfers of data between various portions of the device 200. Additionally, the processor 202 may enable implementation of an operating system or otherwise execute code to manage operations of the device 200. In the subject system, the processor 202 may implement software architecture for sharing content in a messaging application as discussed further below with respect to FIGS. 3 and 4.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

In one or more implementations, in a case where the device 200 corresponds to one of the electronic devices 102-104, the memory 204 may store a messaging application for messaging with the other electronic devices 102-104, and a file management application for managing and/or editing files (e.g., images such as photos, videos and/or documents).

In one or more implementations, in a case where the device 200 corresponds to the server 108, the memory 204 may store a cloud-based service for the storage of user content. The cloud-based service may also facilitate in sharing user content.

The communication interface 206 may include suitable logic, circuitry, and/or code that enables wired or wireless communication, such as between any of the electronic devices 102-104 and the server 108 over the network 106. The communication interface 206 may include, for example, one or more of a Bluetooth communication interface, a cellular interface, an NFC interface, a Zigbee communication interface, a WLAN communication interface, a USB communication interface, or generally any communication interface.

In one or more implementations, one or more of the processor 202, the memory 204, the communication interface 206, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
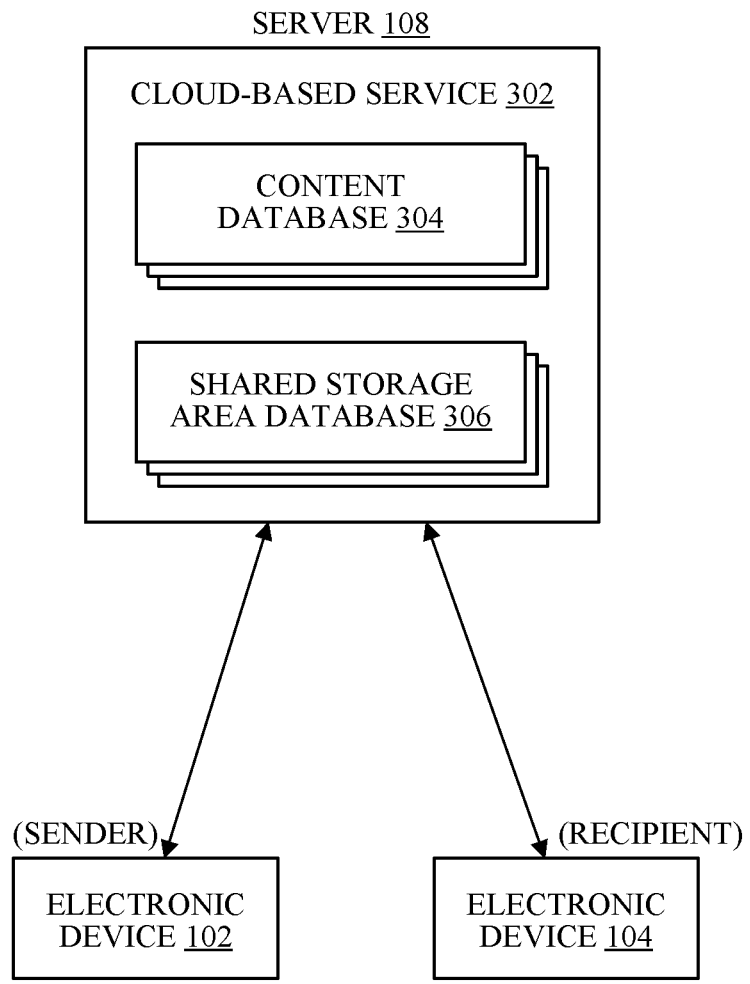
FIG. 3 illustrates an example of a cloud-based service of the subject system that may be implemented by a server in accordance with one or more implementations.

FIG. 3 illustrates an example of a cloud-based service of the subject system that may be implemented by the server 108 in accordance with one or more implementations. For example, the cloud-based service 302 can be implemented by one or more software modules running on the processor 202 of the server 108 and/or any other device. In another example, the cloud-based service 302 can be implemented by one or more software modules implemented by custom hardware (e.g., one or more coprocessors). Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The cloud-based service 302 may include a content database 304 and a shared storage area database 306. In one or more implementations, the cloud-based service 302 provides users with means to store, maintain and access user content such as images, videos, documents and/or music. For example, the cloud-based service 302 may store such content (e.g., images, videos) within the content database 304. The cloud-based service 302 may provide respective users (e.g., of the electronic devices 102-104) with respective user accounts, in order to store, maintain and access their respective content stored on the content database 304.

The cloud-based service 302 may further include a shared storage area database 306. The shared storage area database 306 may reference content in the content database 304, for the creating and maintaining of shared storage areas. Each storage area may correspond to a group of files (e.g., images, videos) that has been shared by one user (e.g., an owner of the files) with other users, for example, who were determined to be relevant to the group of files. For each group of files corresponding to a shared storage area, the shared storage area database 306 may create and maintain references to the files stored in the content database 304.

The content database 304 may be local to the shared storage area database 306, such that content may be locally accessed by the shared storage area database 306. Alternatively or in addition, the content database 304 may be remote from the shared storage area database 306 (e.g., and accessible via the network 106). In one or more implementations, the files stored in the content database 304 may reside in a blob storage area (e.g., corresponding to a separate storage vendor), and the content database 304 may reference the content as stored in the blob storage area.

As shown in FIG. 3, the cloud-based service 302 may communicate with one or more electronic devices. In the example of FIG. 1, the electronic device 102 corresponds to a sending device (e.g., in which an owner is sharing a group of files), and the electronic device 104 corresponds to a recipient device (e.g., which receives access to the group of files). For example, a user of the electronic device 102 may request that a group of files be shared with a user of the electronic device 104. The cloud-based service 302, together with the content database 304 and shared storage area database 306, may receive the request from the electronic device 102, and facilitate in creating a shared storage area corresponding to the group of files for access by the electronic device 104.

In one or more implementations, the cloud-based service 302, the content database 304 and the shared storage area database 306 are implemented via software instructions, stored in the memory 204, which when executed by the processor 202, cause the processor 202 to perform particular function(s).

In one or more implementations, one or more of the cloud-based service 302, the content database 304 and the shared storage area database 306 may be implemented in software (e.g., subroutines and code) and/or hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. In one or more implementations, some or all of the depicted components may share hardware and/or circuitry, and/or one or more of the depicted components may utilize dedicated hardware and/or circuitry. Additional features and functions of these modules according to various aspects of the subject technology are further described in the present disclosure.

Figure 4:
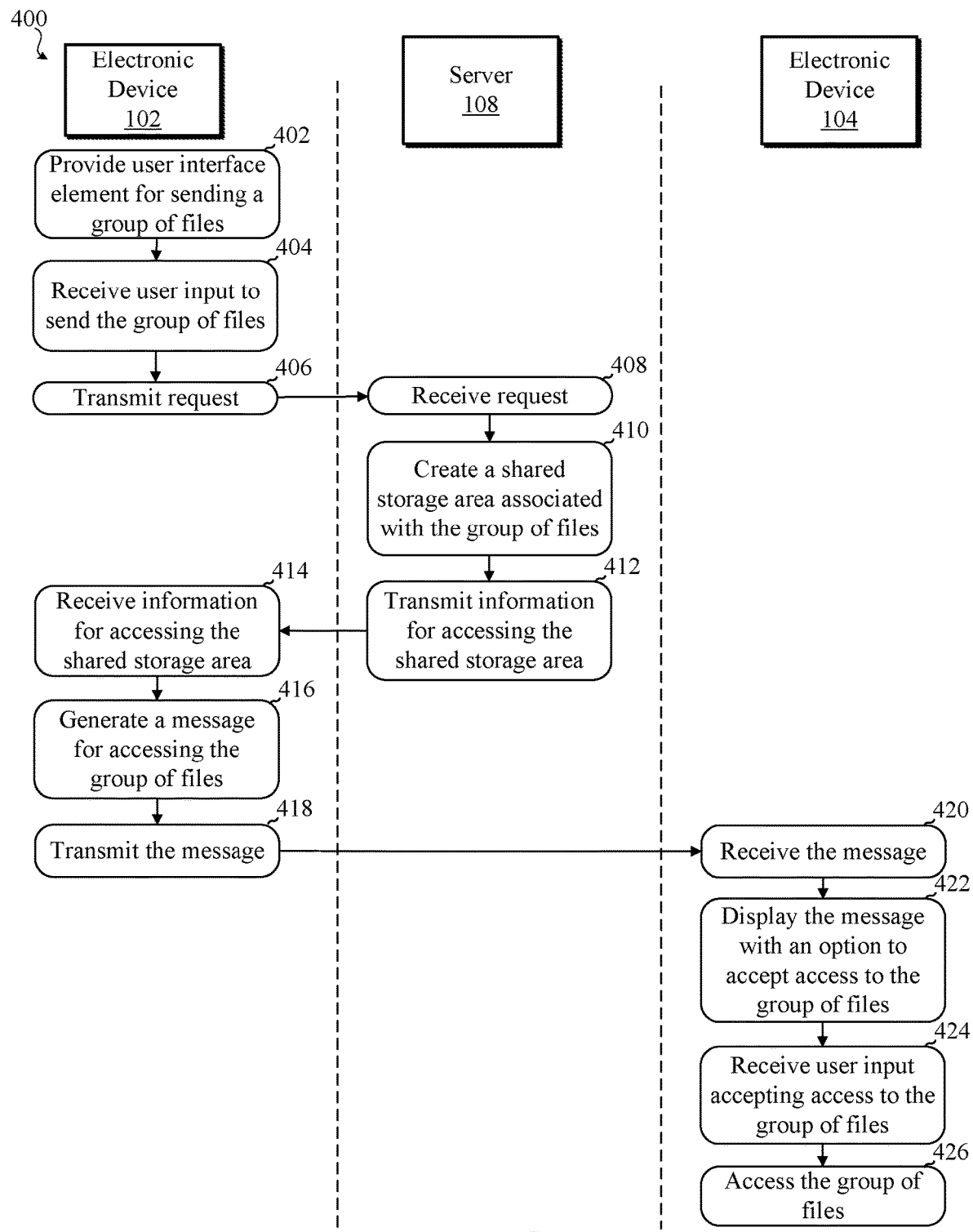
FIG. 4 illustrates an example process for sharing content in a messaging application in accordance with one or more implementations.

FIG. 4 illustrates an example process for sharing content in a messaging application in accordance with one or more implementations. For explanatory purposes, the process 400 is primarily described herein with reference to the electronic devices 102 and 104, and the server 108 of FIG. 1. However, the process 400 is not limited to the electronic devices 102 and 104, and the server 108 of FIG. 1. For example, the process 400 may apply to communication between any combination of two or more of the electronic devices 102-104 and the server 108. Moreover, one or more blocks (or operations) of the process 400 may be performed by one or more other components of the electronic devices 102-104, and the server 108, and/or by other suitable devices. Further for explanatory purposes, the blocks of the process 400 are described herein as occurring in serial, or linearly. However, multiple blocks of the process 400 may occur in parallel. In addition, the blocks of the process 400 need not be performed in the order shown and/or one or more blocks of the process 400 need not be performed and/or can be replaced by other operations.

As noted above, the server 108 may implement a cloud-based service 302 for maintaining user content in the content database 304, and for maintaining shared storage areas that access the user content in the shared storage area database 306. In one or more implementations, users of the electronic devices 102 and 104 may have respective user accounts and be logged into the cloud-based service 302. Alternatively, one user (e.g., of the electronic device 102) may have a user account and be logged into the cloud-based service 302, while the other user (e.g., of the electronic device 104) may not have a registered user account, or may otherwise not be logged into the cloud-based service. In this regard, the electronic devices 102 and 104 may be from different device manufacturers, and/or be running different operating systems or different versions of operating systems.

In one or more implementations, the electronic devices 102 and 104 may communicate within an active message thread which includes at least the electronic devices 102 and 104. The active message thread is associated with a respective messaging application running on each of the electronic devices 102 and 104.

For example, the messaging application may be one or more of an instant messaging application, an email application, a text message application, or another type of application which provides for electronic messaging between the electronic devices 102 and 104. The messaging application (e.g., instant messaging, email, text message) may be the same, or may be different, for the electronic devices 102 and 104.

The electronic device 102 provides a user interface element for sending a group of files to a participant (e.g., the user of the electronic device 104) in the active message thread of the messaging application (402). As noted above, the memory 204 of the electronic device 102 may store a file management application for managing and/or editing user files such as images, videos, documents, music or the like.

The file management application on the electronic device 102 may work in conjunction with the cloud-based service 302, to store and manage user files (e.g., images, videos and/or documents) in the content database 304, for example, in association with a cloud-based library. Moreover, the cloud-based service 302 may automatically identify groups of files (e.g., for potentially sharing with others) based on matching metadata of a user's files. For example, a group of image and/or video files may be identified based on one or more of matching time, location, tagged information (e.g., of the user or contacts of the user), prior user activity, and the like, which is stored in file metadata. In one or more implementations, the server 108 may store the information for the identified groups of files in memory 204.

Moreover, the cloud-based service 302 in conjunction with the electronic device 102 may determine that a group of files is relevant to a user contact (e.g., a participant in an active message thread or other contact). Based on this determination, the electronic device 102 may provide for associating the group of files with the user contact. For example, the electronic device 102 may store a profile picture in association with the user contact. The electronic device 102, in conjunction with the server 108, may associate the user contact with the group of files, for example, based on facial recognition matching of the contact in the profile picture with a appearing within the group of files. Based on the match, the electronic device 102 may consider the contact as being relevant to the group of files.

Additional techniques may be used to identify user contacts that may be relevant to a group of files. For example, such users can be identified based on tagging of the contact in an image or video, determining that prior correspondence between the user and the contact relates to the group of files, and/or other analysis techniques in which information related to the contact (e.g., contact preferences, hobbies, associations) meets a predefined similarity threshold with metadata from the file (e.g., time, place, and/or category).

The user interface element for sharing a group of files within an active message thread on the electronic device 102 may be invoked in different ways. For example, the user interface element may be provided as part of an extension application interface within the messaging application. The extension application interface may be a user-selectable interface for invoking extension applications within the messaging application.

In this regard, extension applications provide for performing functions within the messaging application without requiring the user to switch to a standalone version of the application. Example extension applications may provide for sharing content, and/or adding graphics/animations such as stickers to content within the messaging application (e.g., within a message bubble in an active message thread). One example of an extension application is an extension file management application. An extension file management application may be an extension of a standalone version of the file management application, for performing file management (e.g., managing and/or editing photos and/or videos) within the messaging application.

The extension application interface for launching respective extension applications may be provided within the interface of the messaging application. Thus, the electronic device 102 may receive user input selecting an icon representing the extension file management application from the extension application interface. In response to the user input, the messaging application may display the user interface element for selecting and sending a group of files to others.

Alternatively or in addition, the user interface element for sending the group of files may be provided in response to user selection of highlighted or otherwise differentiated text presented within the messaging application. For example, text within the active message thread and/or a text within a message input interface (e.g., a message compose box) may match with a predefined category (e.g., place, event) associated with the group of files. In one or more implementations, the matching of such text may be based on tokenized terms of the text meeting a threshold similarity value with respect to the predefined categories. In response to a match, the messaging application may highlight or otherwise differentiate display of the matching text within the active message thread and/or the message input interface. In response to user input selecting the matching text, the messaging application may present the user interface element for selecting and sending the group of files to others.

Figure 5A:
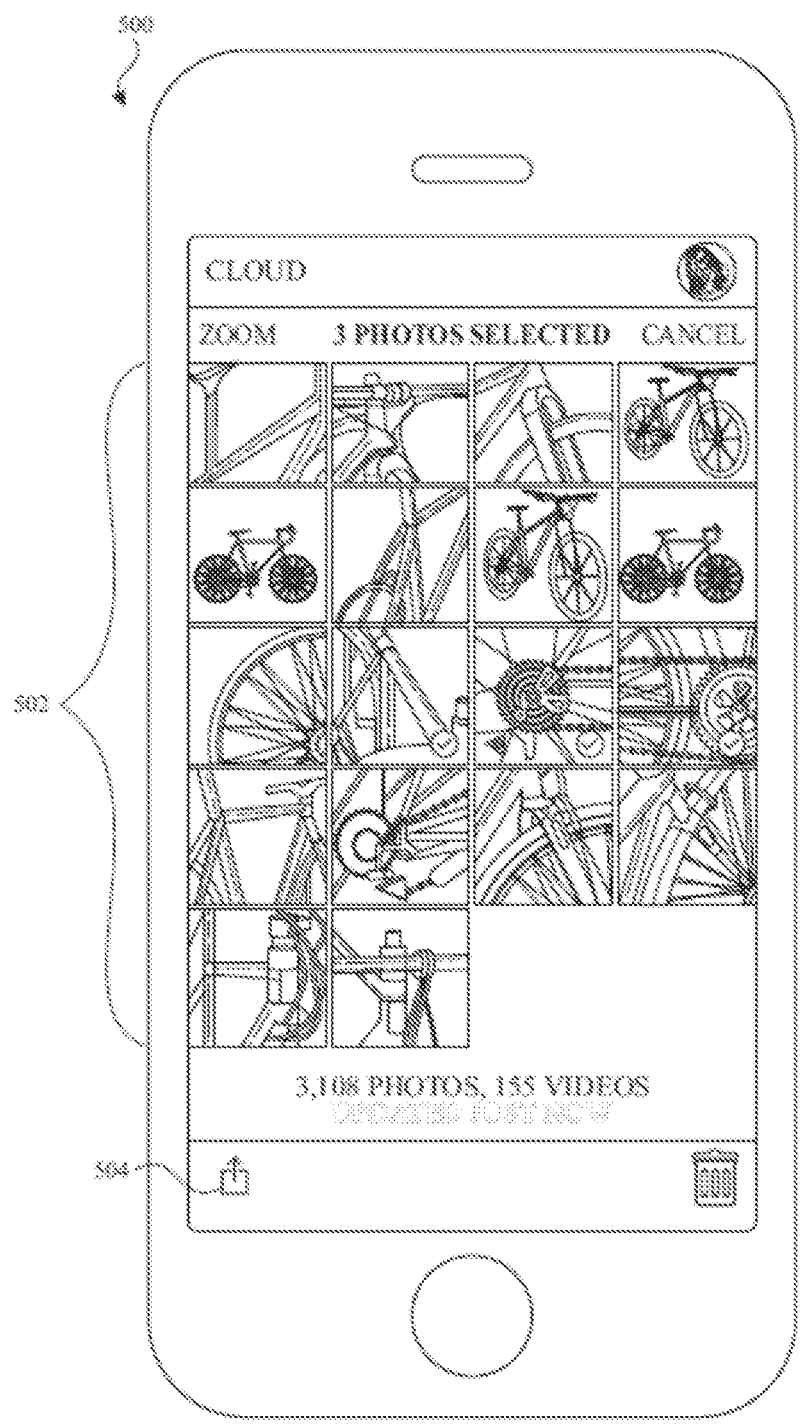
FIGS. 5A-5B illustrate an example user interface, provided by a messaging application on a sending device, for selecting content and a message platform, for sharing with one or more recipients in accordance with one or more implementations.

In this regard, FIG. 5A illustrates an example user interface 500, provided by the messaging application, for selecting a group of files to share with one or more recipients in accordance with one or more implementations. As mentioned above, the cloud-based service 302 may identify groups of files (e.g., for potentially sharing with others) based on metadata associated with the files. In the example user interface 500, a group of files is presented with representations (e.g., thumbnails of image, video or document files) of each file in the group. A user may select one or more of the presented files via an file selection element 502 (e.g., in a full screen mode without exiting the messaging application). After selecting the files, the user may confirm selection of the files for sending via a confirm selection element 504.

Figure 5B:
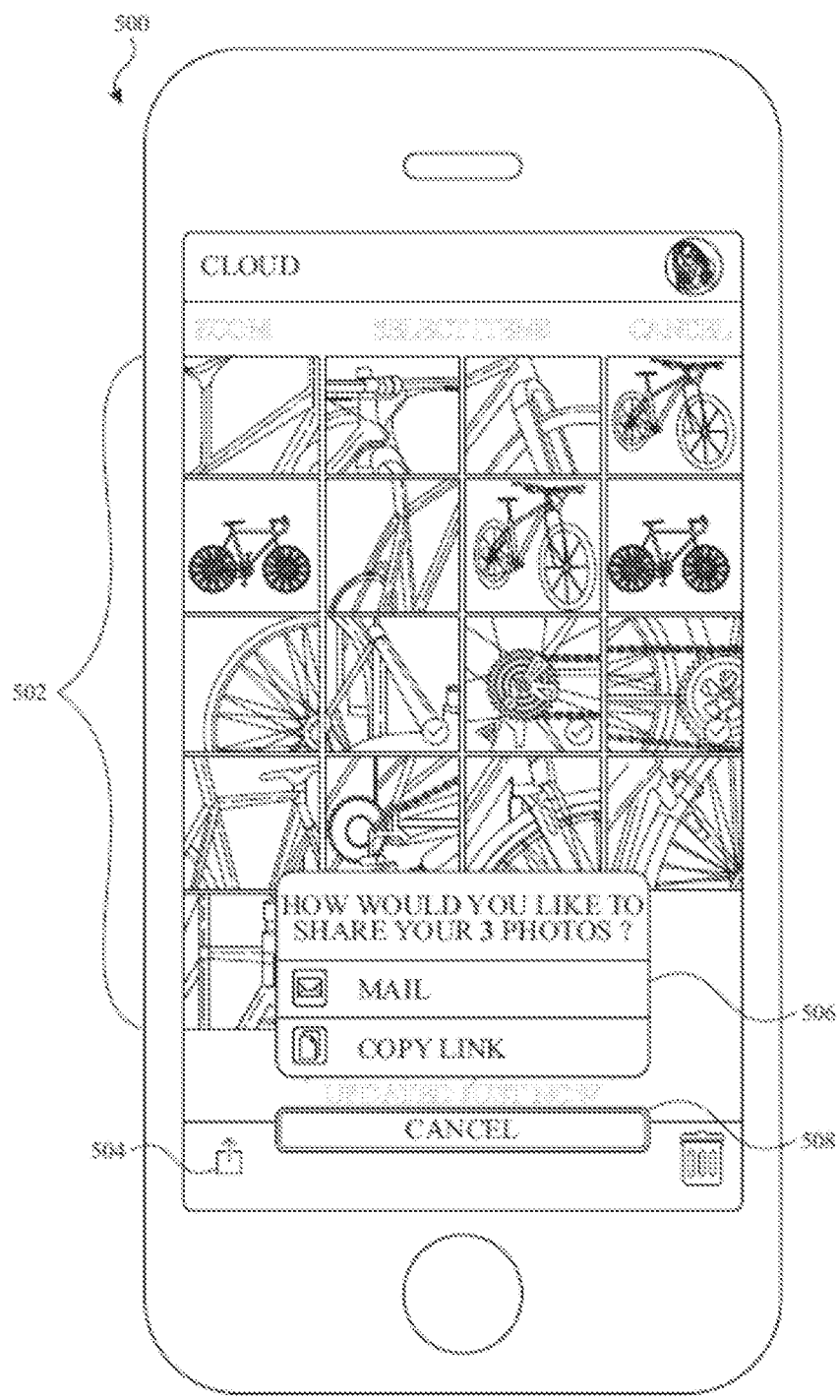

FIG. 5B illustrates that user interface 500 may further provide for selecting the messaging platform by which one or more recipients are to receive selected files in accordance with one or more implementations. In the example of FIG. 5B, a share element 506 provides for the electronic device 102 to email the selected files to participant(s), or to copy a link (e.g., with URL data, described further below) for accessing the files. However, the share element 506 may provide other messaging platforms as options, such as but not limited to, an instant messaging application (e.g., standalone, or as part of a social networking application), an email application, a text message application, and the like. The user interface 500 further includes a cancel element 508 which provides for returning to selection of files as shown in FIG. 5A.

Referring to FIG. 4, the electronic device 102 receives user input to send the group of files (404) based on the user selection of the share element 506. In response, the electronic device 102 transmits the request to the server 108 (406), and the server 108 receives the request from the electronic device 102 (408).

In response to the server 108 receiving the request, the cloud-based service 302 of the server 108 creates a shared storage area in the shared storage area database 306 (410). The shared storage area corresponds to the group of files for sharing with the participants in the active message thread. In one or more implementations, the shared storage area is provisioned separately from other shared storage areas (e.g., corresponding to other respective shared groups of files) stored within the shared storage area database 306. The cloud-based service 302 may create the shared storage area in association with the user account of the user of the electronic device 102, so that the user has ownership rights to the shared storage area.

In one or more implementations, if the group of files being shared are not already stored on the server, the electronic device 102 may provide the group of files to the server 108 for storage. The server 108 may prioritize such storage of the group of files. Otherwise, if the files are already stored on the server 108, the cloud-based service 302 may store references to the stored group of files in the shared storage area database 306.

In this regard, as the user who selected the files and initiated creating the group of files (e.g., the owning user), he/she may have ownership rights to not only access, but to also modify or delete files within the shared storage area. On the other hand, the receiving participants may access a shared group of files, but may not have the rights to modify or delete files within the shared storage area.

In one or more implementations, in a case where the owning user deletes a file (e.g., an image), the cloud-based service 302 may set a flag which marks the file as deleted, rather than deleting the file as stored in the content database 304. In this manner, references to the stored file may be maintained, but access to the file (e.g., by the shared storage area database 306) may be prohibited based on the set flag.

Based on the newly-created shared storage area, the cloud-based service 302 transmits information for accessing the shared storage area to the electronic device 102 (412), and the electronic device 102 receives the information (414). In one or more implementations, the information for accessing the at least one file associated with the shared storage area comprises a network identifier such as a Uniform Resource Locator (URL). Although the following description refers to using a URL, a different network identifier such as a Uniform Resource Identifier (URI), may also be used.

As noted above, the files stored in the content database 304 may be individually referenced. As such, the URL may reference the shared storage area, which in turn references the individual files as stored in the content database 304. In this manner, duplicate copies of the files are not required.

The URL may be transmitted with a hash string which can be decrypted to provide information (e.g., contextual information) for the group of files stored in the content database 304. For each shared storage area, the shared storage area database 306 may store contextual information such as a main file, a title, a number of files, a timeframe, and/or location data for the group of files. This contextual data may be obtained from metadata of one or more files in the group, and may be stored in the respective shared storage area for the group of files.

In one or more implementations, the main file is a file (e.g., an image) within the group of files that is selected (e.g., by the cloud-based service 302) to represent the group of files. Selection of the main file may be based on one or more of file metadata (e.g., time, place, tagging of people, places or things) and analysis techniques for recognizing people, places or things appearing in an image, and automatically selecting a representative file that matches a category (e.g., time, place, people) relevant to the group of files. In one or more implementations, a thumbnail of the main file may be provided instead of the entire main file.

In addition, the contextual information may indicate a current availability for accessing the files. For example, the availability may indicate when all files have not yet been uploaded from local memory 204 of the electronic device 102 to the content database 304 (e.g., in association with a cloud-based library).

Thus, following receipt of the information for accessing the shared storage area (414), the electronic device 102 generates a message to access the group of files, for sending to the electronic device 104 (416). In one or more implementations, the electronic device 102 may present a preview of the generated message for sending to the electronic device 104. For example, the preview may be represented as a single message bubble which includes the above-described contextual information representing the group of files. In one or more implementations, the preview may be displayed as part of a message compose box, with a user-selectable interface for sending the message. In one or more implementations, the message may be automatically transmitted without providing a message preview.

Upon user selection of the interface for sending the message, the electronic device 102 transmits the message to the electronic device 104 (418), and the electronic device 104 receives the message (420). The electronic device 104 displays the message, which may include an interface option to accept access to the group of files (422), such as by clicking on the message bubble.

The processing of the message by the electronic device 104 may vary depending on whether or not the electronic device 104 is associated with a registered user account that is logged in. As noted above, the URL may be transmitted with a hash string which can be decrypted to provide contextual information (e.g., an enriched user interface) for the logged-in electronic device 104. In one or more implementations, the hash string comprises a routing key and a byte array (e.g., a 16-byte array). In a case where the electronic device 104 is associated with a user account that is logged in, the electronic device 104 decrypts the byte array of the hash string with the routing key, in order to generate a protected full token. The cloud-based service 302 decrypts the protected full token to obtain a public sharing key, which is returned to the electronic device 102. The public sharing key may be used by the logged-in electronic device 104 as a key to access the respective shared storage area (e.g., as stored in the shared storage area database 306). As noted above, the shared storage area may reference file content from the content database 304. For example, the shared storage area may access a root record and the children of the root record corresponding to the group of files as stored on the content database 304.

In addition, the logged-in electronic device 104 is able to access the above-mentioned contextual information for the respective shared storage area, as provided by the shared storage area database 306. As noted above, the contextual information may include a main file, a title, a number of files, a timeframe and/or location data, and file availability for the group of files. Thus, the electronic device 104 may query the cloud-based service 302 with the public sharing key, to obtain the contextual information from the shared storage area database 306. The electronic device 104 may display the contextual information within a single message element within the active message thread. In one or more implementations, the contextual information is presented within the active message thread, without requiring the user of the electronic device 104 to accept access to the group of files.

Upon receipt of the user input accepting access to the group of files (424), the electronic device 104 accesses the group of files (426). For example, the electronic device may query the server 108 for the files based on the information (e.g., the URL) provided with the message received from the first electronic device 102. In one or more implementations access to the group of files may be provided with a message bubble. As noted above, the message bubble may correspond to an extension file management application. Thus, for the logged-in electronic device 104, the message bubble may provide for accessing the files within the messaging application (e.g., in a full screen mode, or a partial screen mode). Sample user interfaces for accessing the group file content are described further below with respect to FIGS. 6-11.

In response to receiving the single message element representing the group of files, the logged-in electronic device 104 may provide for the user to reply, select and send additional files for sharing with the participant(s) in the active message thread. In one or more implementations, the extension file management application within the messaging application may provide suggestions, from the respective cloud-based library of the recipient user of the electronic device 104. For example, the suggested files may be determined from matching metadata associated with the shared storage area with metadata of the recipient user's own files (e.g., by time, place, tagging, and the like), for example, as stored in the recipient user's cloud-based library (e.g., for storing images, videos and/or documents) in association with the content database 304. In response, the user of the electronic device 104 may proceed with the process of selecting and sending a group of files to others (e.g., similar to the steps 404, 404 and 406 performed by the electronic device 102).

If the user of the electronic device 104 proceeds with selecting additional files and transmits a corresponding request to the server 108, the cloud-based service 302 may create a new and separate shared storage area in the shared storage area database 306, for accessing both the original group of files (e.g., from the original shared storage area) and the added files. The cloud-based service 302 may provide new information, corresponding to the new shared storage area, for accessing the aggregated group of files. As noted above, the shared storage area database 306 maintains references to individual files and/or groups of files stored within the content database 304. As such, the cloud-based service 302 may configure the new and separate storage area to re-reference the original files, and newly reference the added files as stored in the content database 304 (e.g., in association with the recipient user's cloud-based library). In this manner, creating duplicate copies of the original files either remotely or locally may be avoided or reduced.

In one or more implementations, the logged-in electronic device 104 may provide for the recipient user to forward the single message element representing the group of files in a separate message thread. In this regard, the electronic device receiving the forwarded message (e.g., the electronic device 103 receives the message from the electronic device 104) may access the corresponding shared storage area. In addition, the logged-in electronic device 104 may provide the user to select and send additional files for forwarding along with the original files. In this regard, the new separate storage area may re-reference the original files, and/or newly reference the added files as stored in the content database 304.

In a case where the electronic device 104 is not associated with a registered user account or is not logged-in to a registered user account, a URL with the hash string is still provided to the electronic device 104 (hereinafter the "anonymous" electronic device 104). In one or more implementations, the URL and the hash string for the anonymous electronic device 104 and the logged-in electronic device 104 are the same. However, the URL and the hash string may be different for the anonymous electronic device 104 and the logged-in electronic device 104.

In the case of the anonymous electronic device 104, the user of the anonymous electronic device 104 may not able to access the contextual information from the shared storage area as provided by the shared storage area database 306. In addition, the anonymous electronic device 104 may not access the group of files within an extension application of the messaging application. Further, the anonymous electronic device 104 may not be provided with the ability to reply and select additional files for sharing in association with the shared storage area, or the ability to provide automatic suggestion for such additional files.

In one or more implementations, the anonymous electronic device 104 presents a message element within the active message thread, where the message element includes a clickable URL for accessing the group of files. The user of the electronic device 104 may click on the URL within the message thread to accept access to the group of files (424), thereby launching a browser application on the electronic device 104 to access the website specified by the URL. The group of files may be displayed as individual thumbnails, provided by the website, within the web browser (426).

To view the files, the website specified by the URL is configured to access a predefined web service corresponding to the cloud-based service 302. The predefined web service resolves the hash string (e.g., by decrypting the byte array of the hash string with the routing key) in order to generate a server-encrypted blob. The blob contains key information for accessing the data (e.g., files) in the shared storage area. As such, the blob may function as a token for accessing the shared storage area from the shared storage area database 306. The blob is also provided with a time-to-live (TTL) value.

The web server sends the blob, together with the TTL value, to the cloud-based service 302. In one or more implementations, the cloud-based service 302 may store a flag value for permitting access by anonymous electronic devices, where the flag must be set in order to provide such access. Thus, upon determining that the flag for anonymous access is set and the TTL value has not expired, the cloud-based service 302 facilitates the electronic device 104 in accessing the shared storage area, based on the key information of the blob. The electronic device 104 may therefore access the shared storage area, without requiring the user to be logged into the cloud-based service 302. In a case where the anonymous access flag is set but the TTL value has expired, the web browser on electronic device 104 is required to resend the URL to the predefined web server, to again generate the blob with a new TTL value.

In one or more implementations, the web server and/or the cloud-based service 302 may maintain a count of the number of times that the shared storage area has been accessed (e.g., by counting the number of times that the hash string has been resolved). In addition to maintaining this count, the cloud-based service 302 may store timestamp information for each access.

With the count and timestamp information, it is possible for the cloud-based service 302 to throttle subsequent access to the respective shared storage area stored in the shared storage area database 306. For example, if a threshold number of accesses is met based on the count and timestamps over a certain time period, the cloud-based service 302 may reduce or otherwise prohibit subsequent access to the shared storage area database 306, until a predefined time has passed. In one or more implementations, the throttling may be based on additional or alternative parameters including, but not limited to: the number of prior URLs provided by a particular user (e.g., where throttling is performed based on meeting a threshold number of URLs) and/or a known popularity of a particular group of files or user associated with a group of files (e.g., where throttling is performed based on meeting a threshold number of anticipated or actual accesses).

As noted above, the content and/or user experience for a logged-in user may differ from that of an anonymous user. FIGS. 6-11 illustrate examples of content and user interfaces that relate to the experience of a logged-in user.

Figure 6:
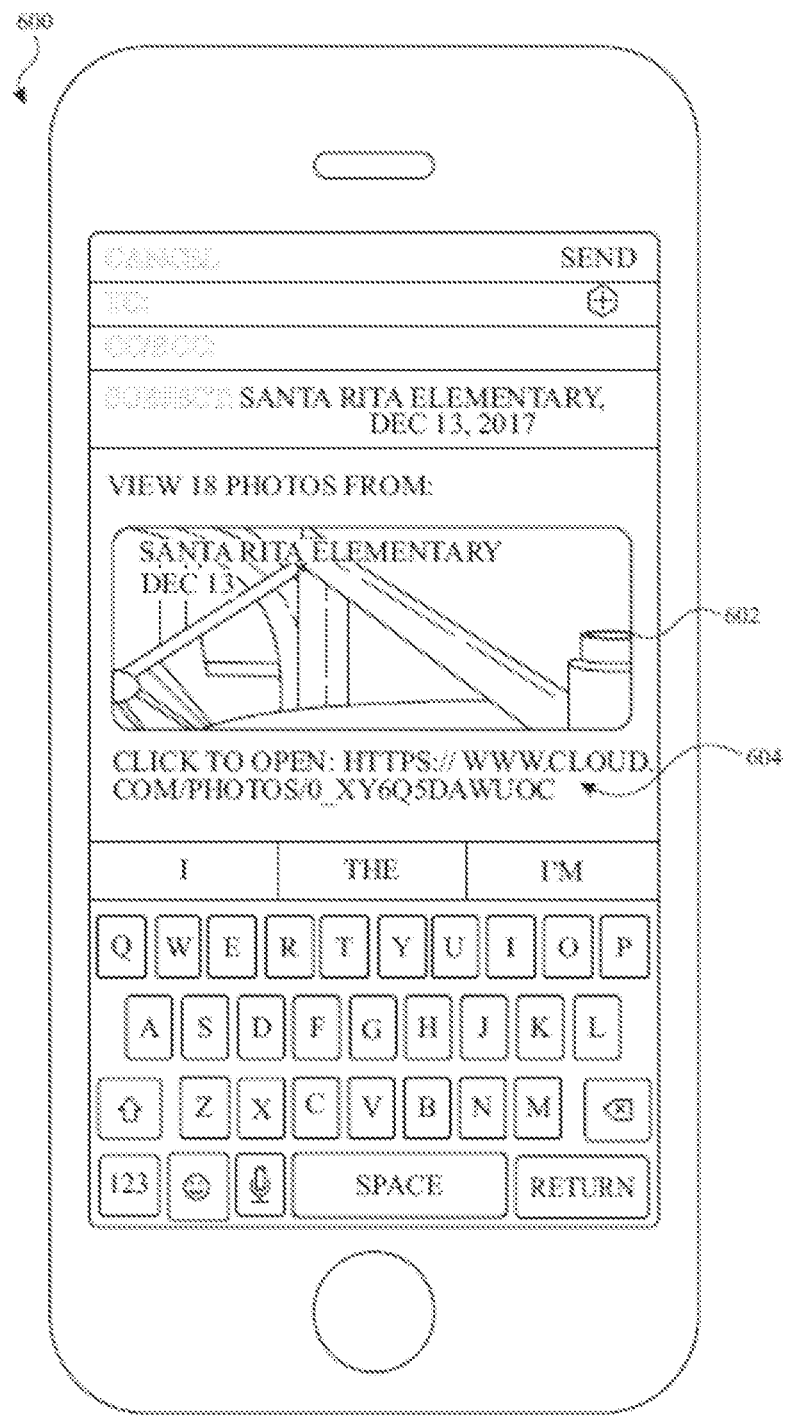
FIG. 6 illustrates an example user interface, provided by a messaging application on a receiving device, including a single messaging element representing a received group of files in accordance with one or more implementations.

FIG. 6 illustrates an example of a logged-in user being provided with contextual information as part of the initial message bubble, which provides the user with an option to access the group of files. The user interface 600 for a group of files is represented as a single messaging element 602. In the example of FIG. 6, the single messaging element 602 includes contextual information of the time (e.g., December 13), place (Santa Rita Elementary), number of image files (e.g., 18) and a main file representative of the group of files. The user interface 600 further includes a URL element 604. User selection of the single messaging element 602 or the URL element 604 may provide the user with access to the shared storage area, as described above.

Figure 7:
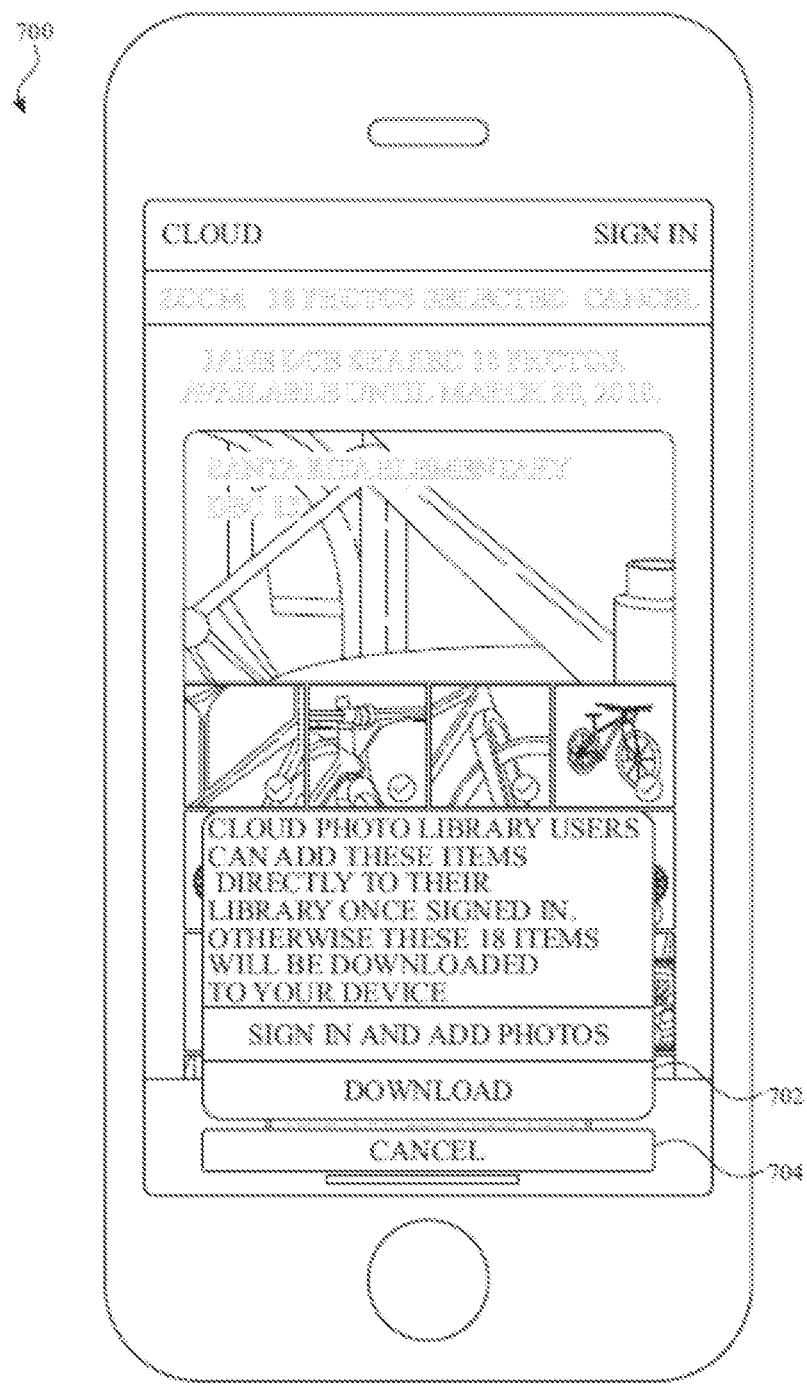
FIG. 7 illustrates an example user interface, provided by a messaging application on a receiving device, which provides a user with different options for accessing a received group of files in accordance with one or more implementations.
Figure 8:
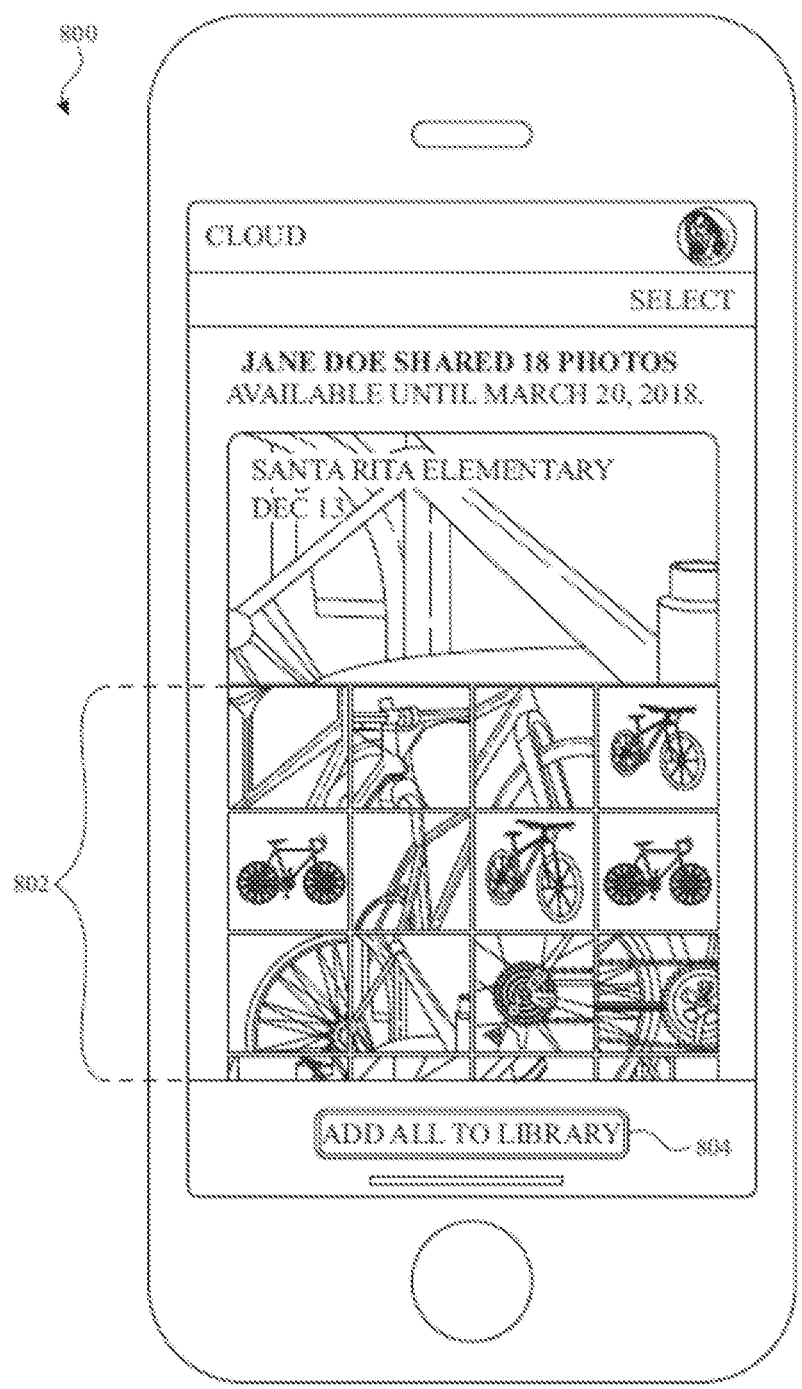
FIG. 8 illustrates an example user interface, provided by a messaging application on a receiving device, which provides for adding a received group of files to a cloud-based library in accordance with one or more implementations.

FIG. 7 illustrates an example user interface 700, provided by a messaging application on the electronic device 104, which provides a user with different options for accessing a received group of files in accordance with one or more implementations. For example, if the group of files (e.g., images, videos and/or documents) for sharing has already been uploaded to the sending user's cloud-based library, and if the recipient user wishes to add those files to his/her cloud-based library as provided by the cloud-based service 302, the user may select element 702. By selecting add element 702, the cloud-based service 302 may create references, within the user cloud-based library, to each of the files in the group of files referenced by the shared storage area database 306 and stored in the content database 304. In this manner, it is not necessary for the cloud-based service 302 to generate additional copies of the files. FIG. 8 illustrates an example user interface 800 which provides for adding the files to the cloud-based library. User interface 800 provides an file selection element 802 for selecting individual files from the group of files, as well as an element 804 to add all files from the group of files to the recipient's cloud-based library as provided by the cloud-based service 302.

Figure 9:
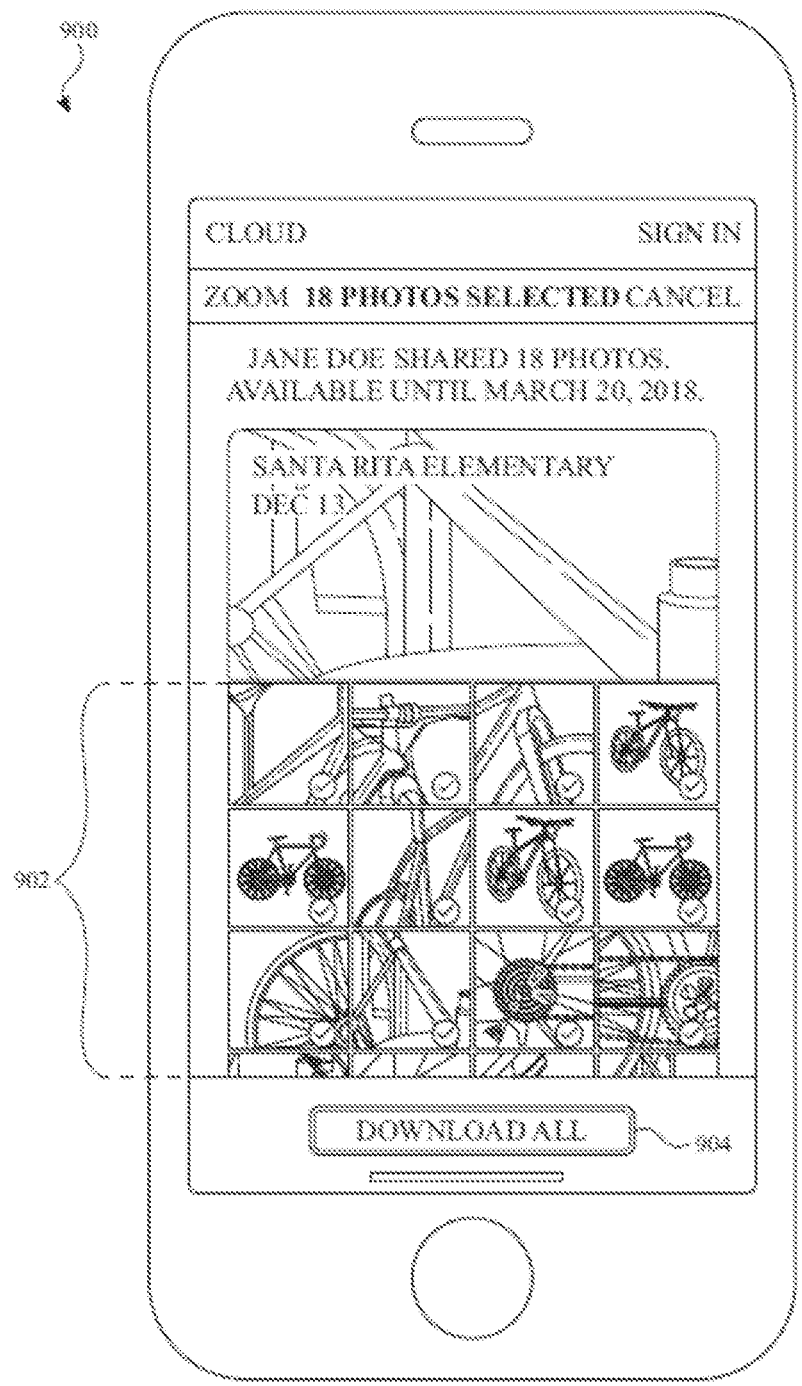
FIG. 9 illustrates an example user interface, provided by a messaging application on a receiving device, which provides downloading a received group of files onto the received device in accordance with one or more implementations.

On the other hand, the user may select download element 704 from user interface 700, which provides for the group of files to be downloaded and locally stored on the memory 204 of the electronic device 104. FIG. 9 illustrates an example user interface 900 which provides for the user to locally download and access the group of files on the electronic device 104. User interface 900 provides an file selection element 902 for selecting individual files from group, as well as an element 904 to download all files from the group of files to the memory 204 of the electronic device 104.

Figure 10:
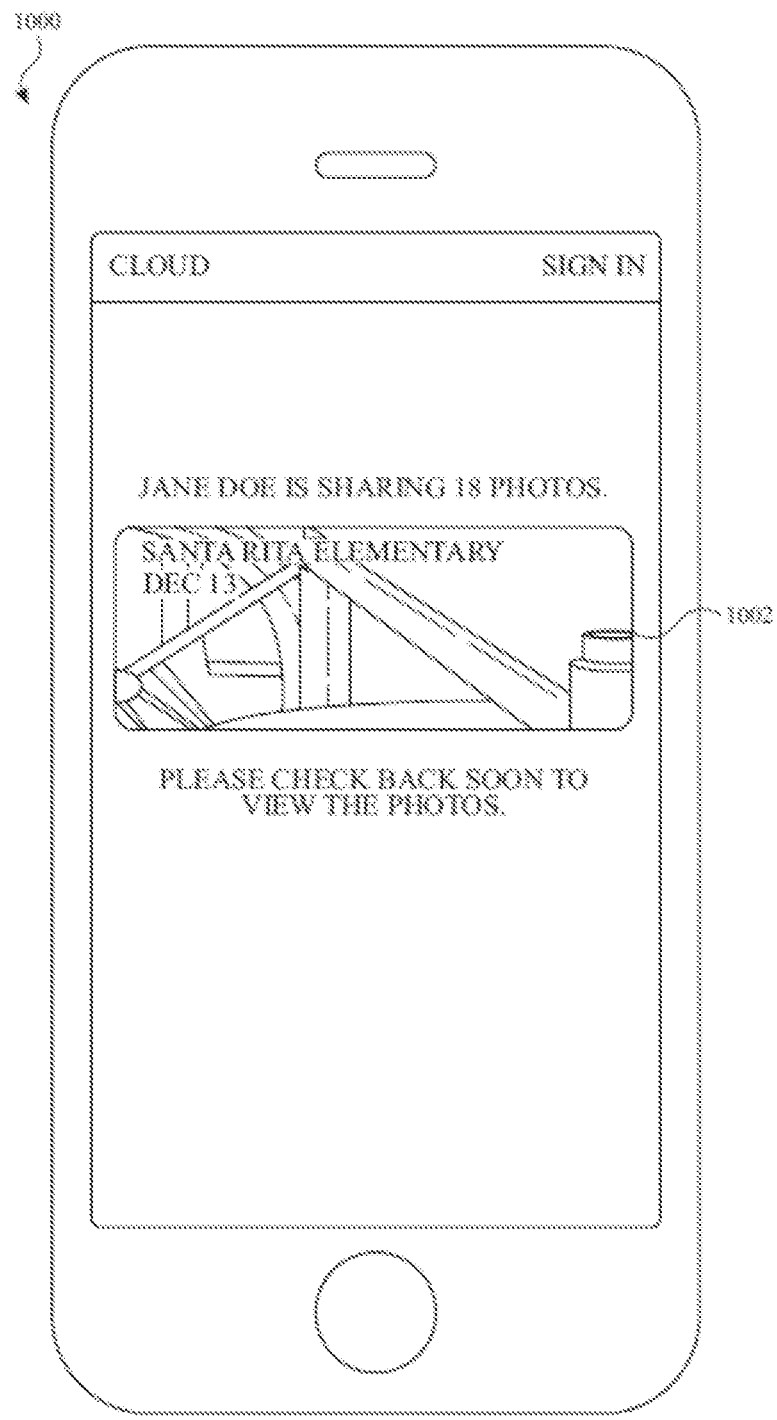
FIG. 10 illustrates an example user interface, provided by a messaging application on a receiving device, indicating that a group of files has been shared but is not yet available for access in accordance with one or more implementations.
Figure 11:
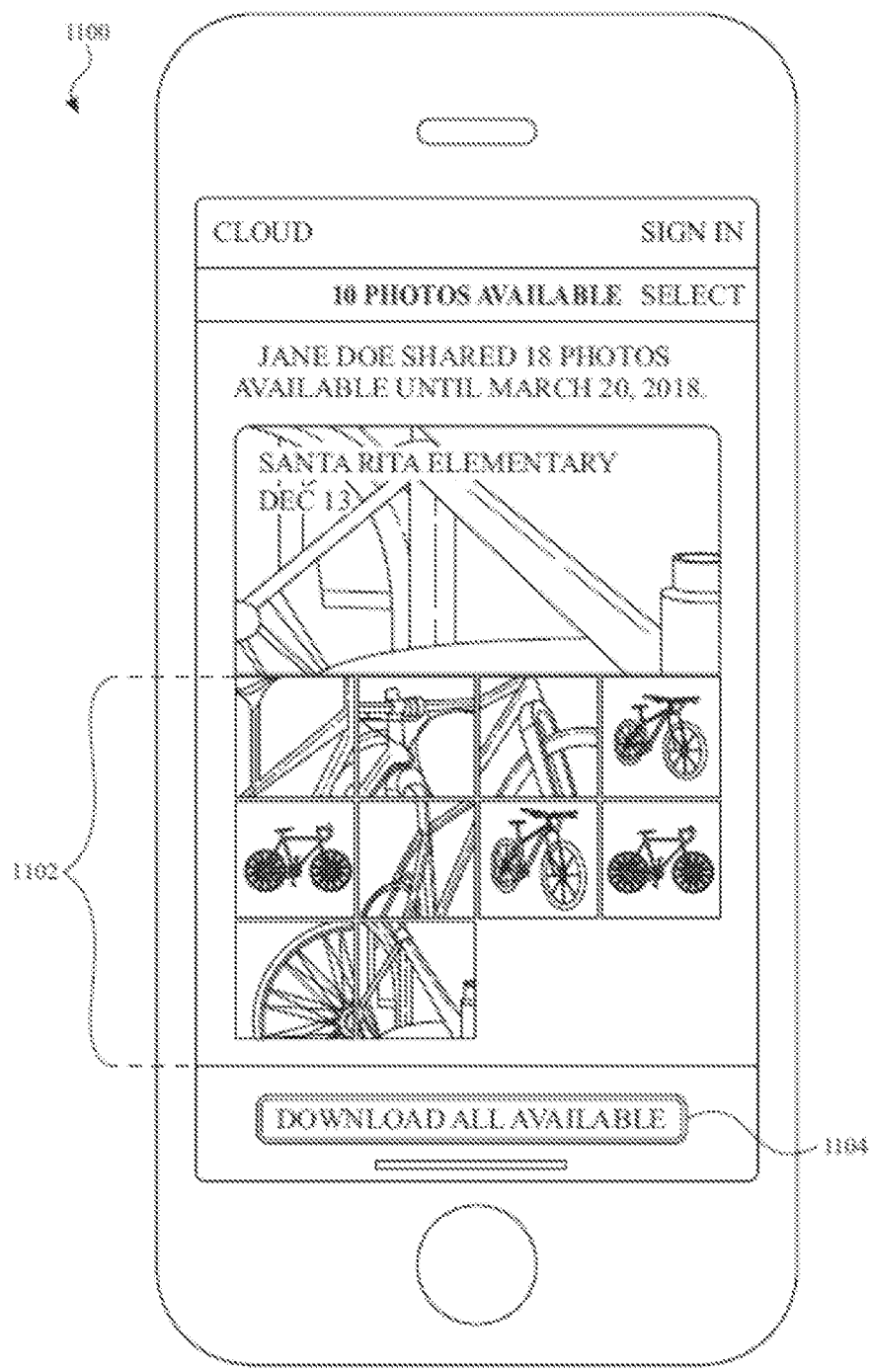
FIG. 11 illustrates an example user interface, provided by a messaging application on a receiving device, indicating that a group of files has been shared and is partially available for access in accordance with one or more implementations.

FIGS. 10-11 illustrate examples of contextual information related to the availability of files, in a case where all files have not yet been uploaded from the electronic device 102 to the content database 304. In FIG. 10, example user interface 1000 illustrates that a group of files has been shared but is not yet available for access. For example, message element 1002 may be provided within the active message thread of the receiving electronic device 104, to indicate that files have been shared but are not yet available for access (e.g., because they have not yet been uploaded to the sending user's cloud-based library).

In addition, FIG. 11 illustrates an example user interface 1100 indicating that a group of files has been shared and is partially available for access. For example, user interface 1100 may be provided within the messaging application (e.g., either in a full screen or within the active message thread), to indicate that a partial group of files that can be accessed. The files can be selected using file selection element 1102, and download element 1104 (e.g., for local download to the electronic device 102). Alternatively or in addition, an "add to library" option may be provided for adding the selected files to the recipient user's cloud-based library (e.g., by re-referencing the files as referenced by original shared storage area).

Figure 12:
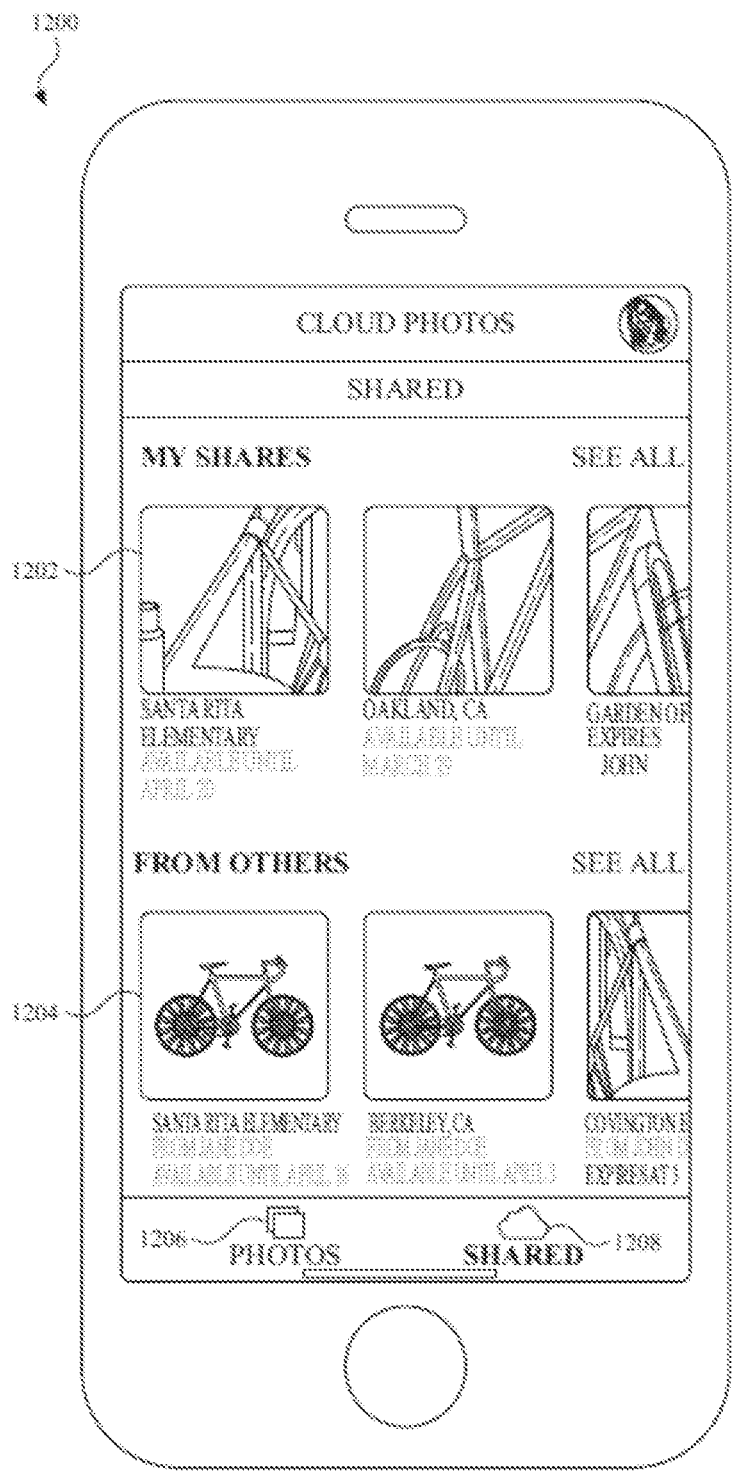
FIG. 12 illustrates an example user interface, provided by a messaging application, for navigating between different shared storage areas associated with respective groups of content in accordance with one or more implementations.

In one or more implementations, the electronic device 102 may include an interface for managing a respective user's different groups of shared storage areas. As noted above, a separate shared storage may be created with respect to different active message threads and/or with respect to a receiving user adding files to an existing shared storage area. FIG. 12 illustrates an example user interface 1200 for navigating between the different shared storage areas associated with respective groups of files. In one or more implementations, the user interface 1200 may be invoked within an file management application running on the electronic device 102. The user interface 1200 may include interface elements 1206 and 1208 for switching between the user's cloud-based library (e.g., corresponding to interface element 1206) and/or the user's shared storage areas (e.g., corresponding to interface element 1208). Thus, if the user selects interface element 1208, the user may access shared storage areas that he/she created (e.g., via share selection element 1202). In addition, the user may access shared storage areas that were created by others and that the user accepted access to (e.g., via share selection element 1204). As noted above, the user may modify his/her own shares, but not those of others.

Figure 13:
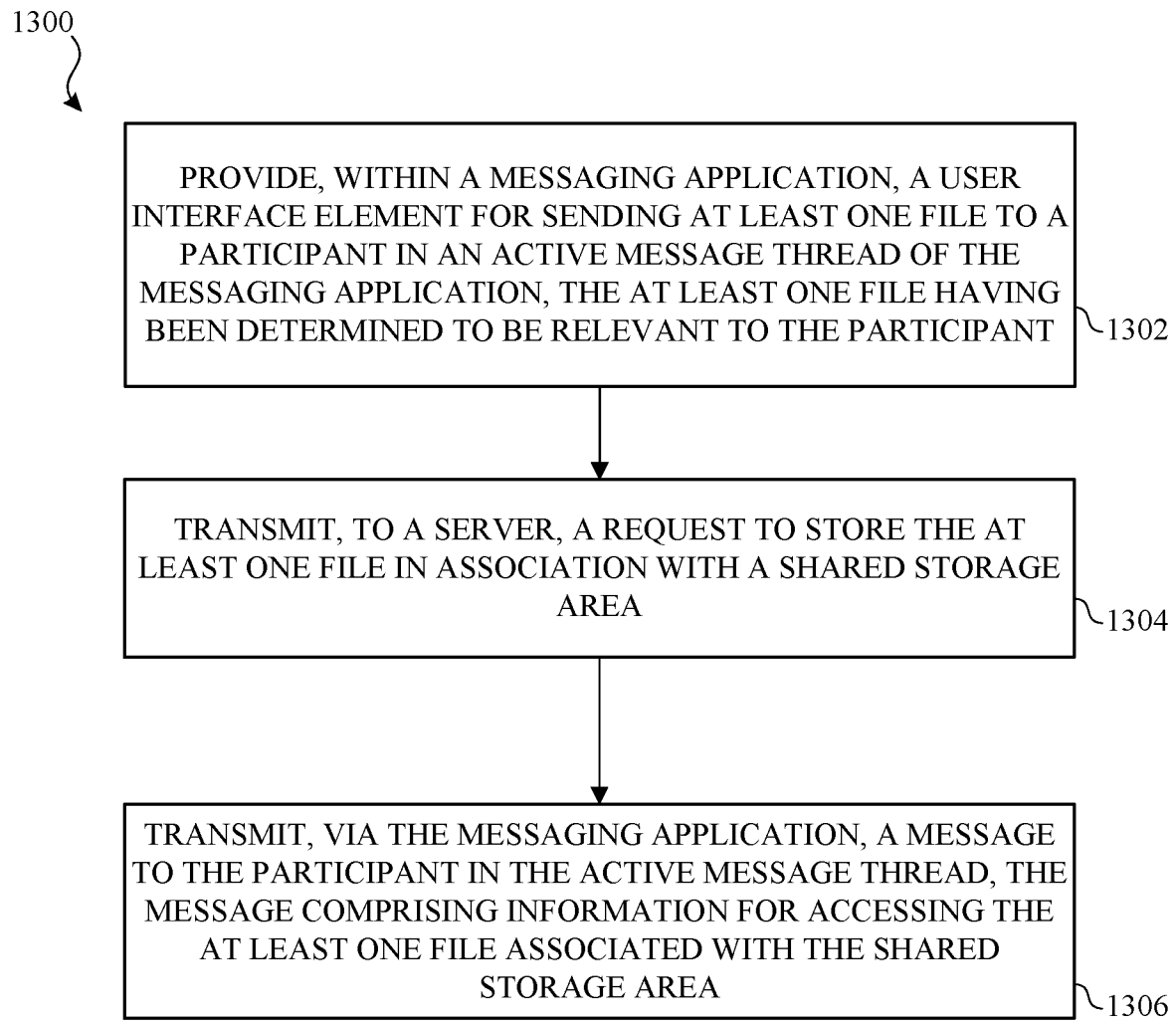
FIG. 13 illustrates a flow diagram of an example process by a sending device for sharing content in a messaging application in accordance with one or more implementations.

FIG. 13 illustrates a flow diagram of an example process by a sending device (e.g., the electronic device 102) for sharing content in a messaging application in accordance with one or more implementations. For explanatory purposes, the process 1300 is primarily described herein with reference to the electronic devices 102, 104 and the server 108 of FIG. 1. However, the process 1300 is not limited to the electronic devices 102, 104 and the server 108 of FIG. 1. For example, the process 1300 may apply to communication between any combination of two or more of the electronic devices 102-104 via the server 108. Moreover, one or more blocks (or operations) of the process 1300 may be performed by one or more other components of the server 108 and/or by other suitable devices. Further for explanatory purposes, the blocks of the process 1300 are described herein as occurring in serial, or linearly. However, multiple blocks of the process 1300 may occur in parallel. In addition, the blocks of the process 1300 need not be performed in the order shown and/or one or more blocks of the process 1300 need not be performed and/or can be replaced by other operations.

The electronic device 102 provides, within a messaging application, a user interface element for sending at least one file to a participant (e.g., a user of electronic device 104) in an active message thread of the messaging application, the at least one file having been determined to be relevant to the participant (1302). For example, the at least one file may be determined to be relevant to the participant based on at least one of facial recognition, a time, or a place associated with the participant and the file, and/or based on a selection of the participant by the user of the electronic device 102.

The user interface element may be provided in multiple ways. For example, the user interface element may be provided in response to user input invoking a file management application provided by the messaging application. Alternatively or in addition, the electronic device 102 may determine that a portion of text within the active message thread of the messaging application corresponds to the at least one file, and provide for differentiated display of the portion of text. The user interface element may be provided in response to receiving user input selecting the differentiated display of the portion of text.

Alternatively or in addition, the electronic device 102 may determine that a portion of text within a message input interface of the messaging application corresponds to the at least one file, and provide for differentiated display of the portion of text. The user interface element is provided in response to receiving user input selecting the differentiated display of the portion of text.

In response to receiving a selection of the user interface element, the electronic device 102 transmits, to the server 108, a request to store the at least one file in association with a shared storage area (1304). The electronic device 102 transmits, via the messaging application, a message to the participant (e.g., to the electronic device 104) in the active message thread, the message comprising information for accessing the at least one file associated with the shared storage area (1306). The at least one file may include a group of files, and the group of files may be represented as a single message element within the active message thread.

The information for accessing the at least one file associated with the shared storage area may be a Uniform Resource Locator (URL). The URL may reference the shared storage area for access of the at least one file. The URL may be transmitted with a hash string for accessing contextual information of the least one file from the shared storage area. The contextual information may be configured for display in the active message thread.

Figure 14:
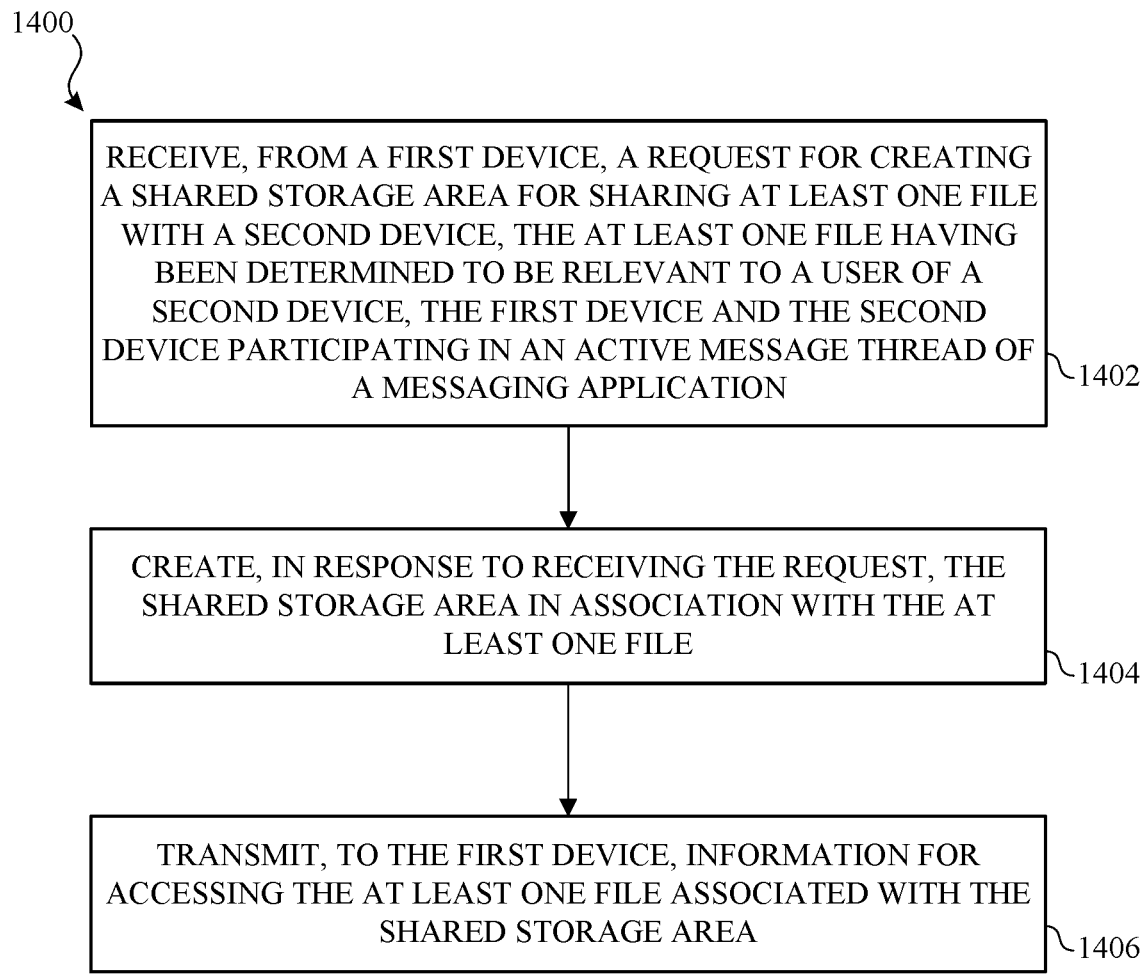
FIG. 14 illustrates a flow diagram of another example process by a server for sharing content in a messaging application in accordance with one or more implementations.

FIG. 14 illustrates a flow diagram of another example process by a server (e.g., the server 108) for sharing content in a messaging application in accordance with one or more implementations. For explanatory purposes, the process 1400 is primarily described herein with reference to the electronic devices 102, 104, and the server 108 of FIG. 1. However, the process 1400 is not limited to the electronic devices 102, 104, and the server 108 of FIG. 1. For example, the process 1400 may apply to communication between any combination of two or more of the electronic devices 102-104 via the server 108. Moreover, one or more blocks (or operations) of the process 1400 may be performed by one or more other components of the server 108 and/or by other suitable devices. Further for explanatory purposes, the blocks of the process 1400 are described herein as occurring in serial, or linearly. However, multiple blocks of the process 1400 may occur in parallel. In addition, the blocks of the process 1400 need not be performed in the order shown and/or one or more blocks of the process 1400 need not be performed and/or can be replaced by other operations.

The server 108 receives, from the electronic device 102, a request for creating a shared storage area for sharing at least one file with the electronic device 104 (1402). The at least one file is determined to be relevant to a user of the electronic device 104. The electronic devices 102 and 104 are participating in an active message thread of a messaging application.

The server 108 creates, in response to receiving the request, the shared storage area in association with the at least one file (1404). The server 108 transmits, to the electronic device 102, information for accessing the at least one file associated with the shared storage area (1406).

The electronic device 102 may be configured to send a message to the electronic device 104, the message including the information for accessing the at least one file associated with the shared storage area. The server 108 may receive, from the second device, a request to access the at least one file associated with the shared storage area. The server 108 may provide, in response to receiving the request from the second device, the at least one file associated with the shared storage area to the second device.

The information for accessing the at least one file associated with the shared storage area may be a Uniform Resource Locator (URL). The URL may reference the shared storage area for access of the at least one file.

The URL may be transmitted with a hash string for accessing contextual information of the least one file from the shared storage area. For example, the contextual information may be configured for display in the active message thread on the electronic device 104.

Figure 15:
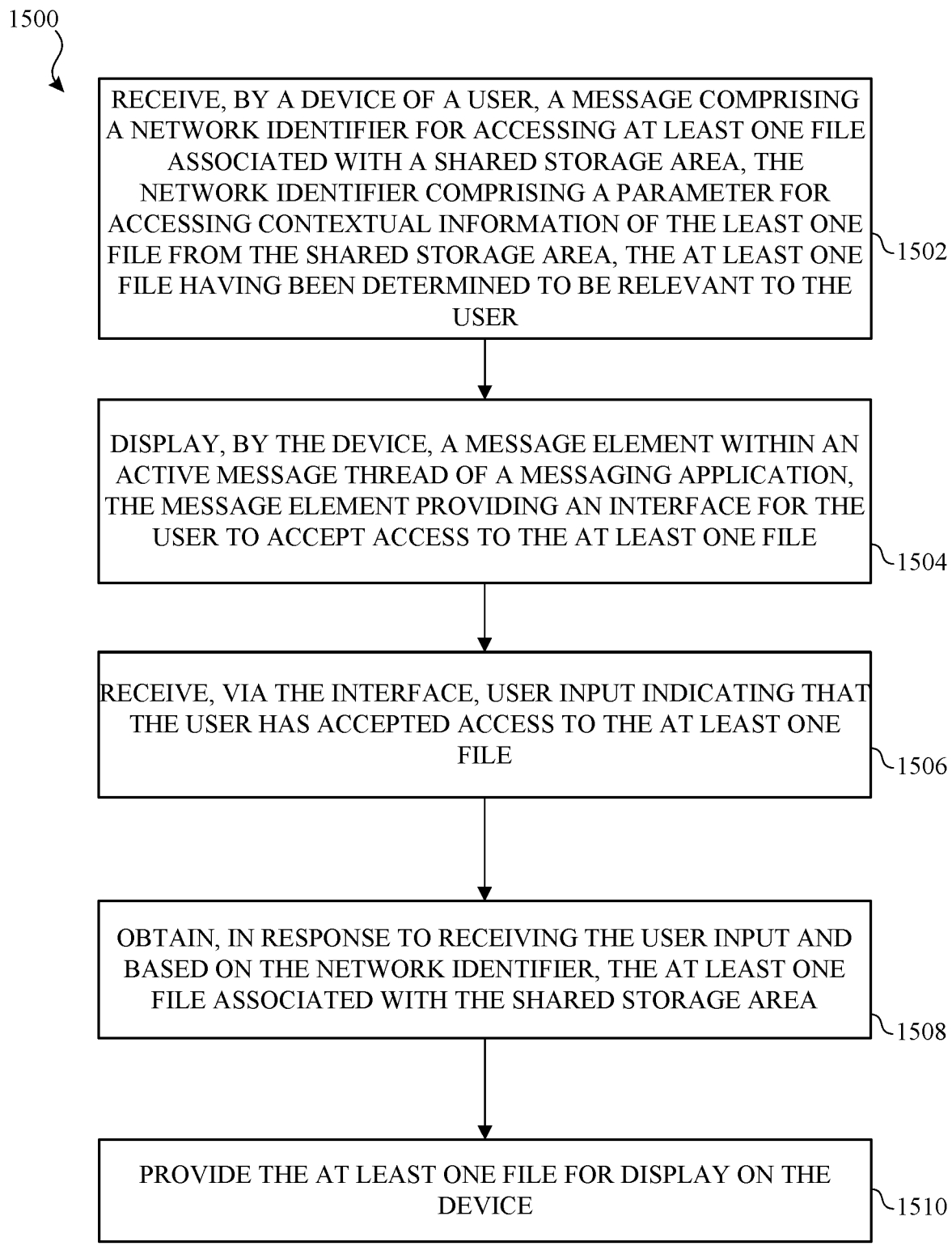
FIG. 15 illustrates a flow diagram of another example process by a receiving device for sharing content in a messaging application in accordance with one or more implementations.

FIG. 15 illustrates a flow diagram of another example process by a receiving device (e.g., the electronic device 104) for sharing content in a messaging application in accordance with one or more implementations. For explanatory purposes, the process 1500 is primarily described herein with reference to the electronic device 104 and the server 108 of FIG. 1. However, the process 1500 is not limited to the electronic device 104 and the server 108 of FIG. 1. For example, the process 1500 may apply to communication between any combination of two or more of the electronic devices 102-104 via the server 108. Moreover, one or more blocks (or operations) of the process 1500 may be performed by one or more other components of the server 108 and/or by other suitable devices. Further for explanatory purposes, the blocks of the process 1500 are described herein as occurring in serial, or linearly. However, multiple blocks of the process 1500 may occur in parallel. In addition, the blocks of the process 1500 need not be performed in the order shown and/or one or more blocks of the process 1500 need not be performed and/or can be replaced by other operations.

The electronic device 104 receives (e.g., from the server 108) a message comprising a network identifier (e.g., a URI or a URL) for accessing at least one file associated with a shared storage area (1502). The network identifier may include a parameter (e.g., a hash string) for accessing contextual information of the least one file from the shared storage area, the at least one file having been determined to be relevant to a user of the electronic device 104.

The electronic device 104 displays a message element within an active message thread of a messaging application (1504). The message element provides an interface for the user to accept access to the at least one file. The electronic device 104 receives, via the interface, user input indicating that the user has accepted access to the at least one file (1506). The electronic device 104 obtains, in response to receiving the user input and based on the network identifier, the at least one file associated with the shared storage area (1508).

The electronic device 104 provides the at least one file for display on the device (1510). The shared storage area may correspond to a cloud-based service having multiple user accounts associated therewith.

In a case where the user has a user account on the cloud-based service and is logged into the user account with the device, the electronic device 104 may obtain the contextual information of the least one file from the shared storage area, and display the contextual information in the message element of the active message thread. Further, the electronic device 104 may display the at least one file in the message element of the active message thread, by referencing the at least one file based on the network identifier. In a case where the user does not have a user account on the cloud-based service or is not logged into the user account with the device, the electronic device 104 may direct to a webpage corresponding to the network identifier via a web browser.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

Figure 16:
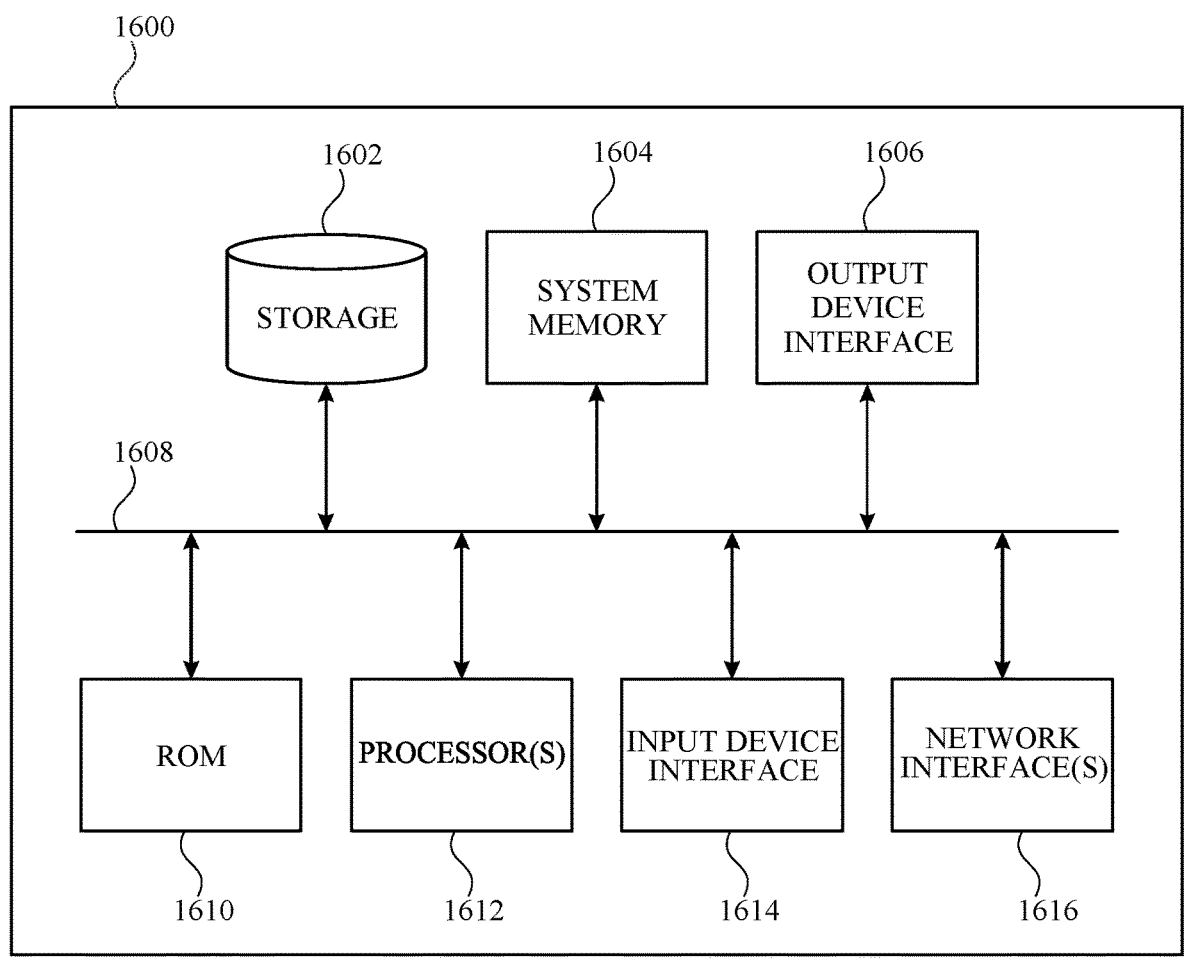
FIG. 16 illustrates an example electronic system with which aspects of the subject technology may be implemented in accordance with one or more implementations.

FIG. 16 illustrates an electronic system 1600 with which one or more implementations of the subject technology may be implemented. The electronic system 1600 can be, and/or can be a part of, one or more of the electronic devices 102-104, and/or one or the server 108 shown in FIG. 1. The electronic system 1600 may include various types of computer readable media and interfaces for various other types of computer readable media. The electronic system 1600 includes a bus 1608, one or more processing unit(s) 1612, a system memory 1604 (and/or buffer), a ROM 1610, a permanent storage device 1602, an input device interface 1614, an output device interface 1606, and one or more network interfaces 1616, or subsets and variations thereof.

The bus 1608 collectively represents all system, peripheral, and chipset buses that communicatively connect the numerous internal devices of the electronic system 1600. In one or more implementations, the bus 1608 communicatively connects the one or more processing unit(s) 1612 with the ROM 1610, the system memory 1604, and the permanent storage device 1602. From these various memory units, the one or more processing unit(s) 1612 retrieves instructions to execute and data to process in order to execute the processes of the subject disclosure. The one or more processing unit(s) 1612 can be a single processor or a multi-core processor in different implementations.

The ROM 1610 stores static data and instructions that are needed by the one or more processing unit(s) 1612 and other modules of the electronic system 1600. The permanent storage device 1602, on the other hand, may be a read-and-write memory device. The permanent storage device 1602 may be a non-volatile memory unit that stores instructions and data even when the electronic system 1600 is off. In one or more implementations, a mass-storage device (such as a magnetic or optical disk and its corresponding disk drive) may be used as the permanent storage device 1602.

In one or more implementations, a removable storage device (such as a floppy disk, flash drive, and its corresponding disk drive) may be used as the permanent storage device 1602. Like the permanent storage device 1602, the system memory 1604 may be a read-and-write memory device. However, unlike the permanent storage device 1602, the system memory 1604 may be a volatile read-and-write memory, such as random access memory. The system memory 1604 may store any of the instructions and data that one or more processing unit(s) 1612 may need at runtime. In one or more implementations, the processes of the subject disclosure are stored in the system memory 1604, the permanent storage device 1602, and/or the ROM 1610. From these various memory units, the one or more processing unit(s) 1612 retrieves instructions to execute and data to process in order to execute the processes of one or more implementations.

The bus 1608 also connects to the input and output device interfaces 1614 and 1606. The input device interface 1614 enables a user to communicate information and select commands to the electronic system 1600. Input devices that may be used with the input device interface 1614 may include, for example, alphanumeric keyboards and pointing devices (also called "cursor control devices"). The output device interface 1606 may enable, for example, the display of files generated by electronic system 1600. Output devices that may be used with the output device interface 1606 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 16, the bus 1608 also couples the electronic system 1600 to one or more networks and/or to one or more network nodes, such as the server 108 shown in FIG. 1, through the one or more network interface(s) 1616. In this manner, the electronic system 1600 can be a part of a network of computers (such as a LAN, a wide area network ("WAN"), or an Intranet, or a network of networks, such as the Internet. Any or all components of the electronic system 1600 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
    receiving, by a device of a user and from another device of another user, a message comprising a network identifier for accessing at least one file associated with a shared storage area, the network identifier comprising a parameter for accessing contextual information of the at least one file from the shared storage area, the at least one file having been suggested by the other device to be relevant to the user;
    displaying, by the device, a message element within an active message thread of a messaging application, the message element providing an interface for the user to accept access to the at least one file;

receiving, via the interface, user input indicating that the user has accepted the access to the at least one file;

obtaining, in response to receiving the user input and based on the network identifier, the at least one file associated with the shared storage area; and providing, based in part on account information of the user, the at least one file for display on the device, wherein the at least one file comprises a group of files, wherein the group of files is represented as the message element within the active message thread, the message element includes the contextual information, the contextual information comprises a representation of a main file of the group of files, and the contextual information indicates a current availability for accessing the group of files from the shared storage area.

2. The method of claim 1, wherein the shared storage area corresponds to a cloud-based service having multiple user accounts associated therewith.

3. The method of claim 2, wherein in a case where the user has a user account on the cloud-based service and is logged into the user account with the device, the method further comprises:

obtaining the contextual information of the at least one file from the shared storage area; and displaying the contextual information in the message element of the active message thread.

4. The method of claim 2, wherein in a case in which the user has a user account on the cloud-based service and is logged into the user account with the device, the providing of the at least one file for display on the device based in part on the account information of the user comprises:

displaying the at least one file in the message element of the active message thread, by referencing the at least one file based on the network identifier.

5. The method of claim 2, wherein in a case where the user does not have a user account on the cloud-based service or is not logged into the user account with the device, the providing of the at least one file for display on the device based in part on the account information of the user comprises:

directing to a webpage corresponding to the network identifier via a web browser.

6. The method of claim 1, further comprising, prior to providing the message element providing the interface for the user to accept the access to the at least one file, providing, within the active message thread of the messaging application, an additional message element that indicates that files have been shared but are not yet available for access.

7. The method of claim 1, wherein the message element providing the interface for the user to accept the access to the at least one file provides access to a partial group of files corresponding to the at least one file.

8. The method of claim 1, wherein the message element within the active message thread comprises a message bubble.

9. The method of claim 8, wherein the group of files is represented as the message bubble that includes contextual information representing the group of files.

10. An electronic device, comprising:
a memory; and
one or more processors configured to:
receive, from another device of another user, a message comprising a network identifier for accessing at least one file associated with a shared storage area, the network identifier comprising a parameter for accessing contextual information of the at least one file from the shared storage area, the at least one file having been suggested by the other device to be relevant to a user of the electronic device;

display a message element within an active message thread of a messaging application, the message element providing an interface for the user to accept access to the at least one file;

receive, via the interface, user input indicating that the user has accepted the access to the at least one file;

obtain, in response to receiving the user input and based on the network identifier, the at least one file associated with the shared storage area; and provide, based in part on account information of the user, the at least one file for display on the electronic device, wherein the at least one file comprises a group of files, wherein the group of files is represented as the message element within the active message thread, the message element includes the contextual information, the contextual information comprises a representation of a main file of the group of files, and the contextual information indicates a current availability for accessing the group of files from the shared storage area.

11. The electronic device of claim 10, wherein the shared storage area corresponds to a cloud-based service having multiple user accounts associated therewith.

12. The electronic device of claim 11, wherein the user has a user account with the cloud-based service and is logged into the user account on the electronic device, and wherein the one or more processors are further configured to:

obtain the contextual information of the least one file from the shared storage area; and display the contextual information in the message element of the active message thread.

13. The electronic device of claim 11, wherein the user has a user account with the cloud-based service and is logged into the user account on the electronic device, and wherein the one or more processors are configured to provide the at least one file for display on the electronic device based in part on the account information of the user by:

displaying the at least one file in the message element of the active message thread, by referencing the at least one file based on the network identifier.

14. The electronic device of claim 11, wherein the user does not have a user account with the cloud-based service or is not logged into the user account on the electronic device, and wherein the one or more processors are further configured to provide the at least one file for display on the electronic device based in part on the account information of the user by:

directing to a webpage corresponding to the network identifier via a web browser.

15. The electronic device of claim 10, wherein the one or more processors are further configured to, prior to providing the message element providing the interface for the user to accept the access to the at least one file, provide, within the active message thread of the messaging application, an additional message element that indicates that files including the at least one file have been shared but are not yet available for access.

16. The electronic device of claim 10, wherein the message element providing the interface for the user to accept the access to the at least one file provides access to a partial group of files corresponding to the at least one file.

17. A non-transitory computer-readable medium storing instructions which, when executed by one or more processors, cause the one or more processors to perform operations comprising:
   receiving, by a device of a user and from another device of another user, a message comprising a network identifier for accessing at least one file associated with a shared storage area, the network identifier comprising a parameter for accessing contextual information of the at least one file from the shared storage area, the at least one file having been suggested by the other device to be relevant to the user;
   displaying, by the device, a message element within an active message thread of a messaging application, the message element including an interface for the user to accept access to the at least one file;
   receiving, via the interface, user input indicating that the user has accepted the access to the at least one file;
   obtaining, in response to receiving the user input and based on the network identifier, the at least one file associated with the shared storage area; and
   providing, based in part on account information of the user, the at least one file for display on the device,
   wherein the at least one file comprises a group of files, wherein the group of files is represented as the message element within the active message thread, the message element includes the contextual information, the contextual information comprises a representation of a main file of the group of files, and the contextual information indicates a current availability for accessing the group of files from the shared storage area.

18. The non-transitory computer-readable medium of claim 17, wherein, in a case in which the user has a user account with a cloud-based service and is logged into the user account with the device, the operations further comprise:
   obtaining the contextual information of the least one file from the shared storage area; and
   displaying the contextual information in the message element of the active message thread.

19. The non-transitory computer-readable medium of claim 18, wherein, in a case in which the user has the user account on the cloud-based service and is logged into the user account with the device, the providing of the at least one file for display on the device based in part on the account information of the user comprises:
   displaying the at least one file in the message element of the active message thread, by referencing the at least one file based on the network identifier.

20. The non-transitory computer-readable medium of claim 18, wherein, in a case in which the user does not have a user account on the cloud-based service or is not logged into the user account with the device, the providing of the at least one file for display on the device based in part on the account information of the user comprises:
   directing to a webpage corresponding to the network identifier via a web browser.

21. The non-transitory computer-readable medium of claim 17, the operations further comprising, prior to providing the message element including the interface for the user to accept the access to the at least one file, providing, within the active message thread of the messaging application, an additional message element that indicates that the at least one file has been shared but is not yet available for access.

* * * * *